(12) United States Patent  
Ikeda

(10) Patent No.: US 8,836,891 B2
(45) Date of Patent: Sep. 16, 2014

(54) LIQUID CRYSTAL DISPLAY DEVICE AND GAME DEVICE

(75) Inventor: Yoshitaka Ikeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 810 days.

(21) Appl. No.: 13/057,178

(22) PCT Filed: Jul. 10, 2009

(86) PCT No.: PCT/JP2009/062626
§ 371 (c)(1),
(2), (4) Date: Feb. 2, 2011

(87) PCT Pub. No.: WO2010/016356
PCT Pub. Date: Feb. 11, 2010

(65) Prior Publication Data
US 2011/0134363 A1    Jun. 9, 2011

(30) Foreign Application Priority Data

Aug. 5, 2008  (JP) ................. 2008-202338

(51) Int. Cl.
*G02F 1/1335* (2006.01)
*A63F 9/24* (2006.01)
*G02F 1/1347* (2006.01)
*F21V 8/00* (2006.01)
*G02F 1/1334* (2006.01)
*G02F 1/1333* (2006.01)

(52) U.S. Cl.
CPC ............ *G02F 1/1347* (2013.01); *G02F 1/1334* (2013.01); *G02F 2001/133391* (2013.01); *G02F 2001/133331* (2013.01); *G02B 6/0011* (2013.01)

USPC ................... 349/62; 349/57; 349/112; 463/31

(58) Field of Classification Search
USPC ........................ 349/58–65, 57, 112; 463/31
See application file for complete search history.

(56) References Cited

U.S. PATENT DOCUMENTS

2003/0157980 A1 *  8/2003  Loose et al. ............... 463/20
2004/0214635 A1 * 10/2004  Okada ....................... 463/30
2006/0119765 A1 *  6/2006  Abileah .................... 349/86

FOREIGN PATENT DOCUMENTS

| JP | 06-123918 A | 5/1994 |
| JP | 2003-033498 A | 2/2003 |
| JP | 2005-185624 A | 7/2005 |
| JP | 2006-141559 A | 6/2006 |

OTHER PUBLICATIONS

Official Communication issued in International Patent Application No. PCT/JP2009/062626, mailed on Aug. 18, 2009.

* cited by examiner

*Primary Examiner* — Bumsuk Won
*Assistant Examiner* — Charles Chang
(74) *Attorney, Agent, or Firm* — Keating & Bennett, LLP

(57) ABSTRACT

Provided is a liquid crystal display device including: a main display region (27) and a sub display region (28a, 28b) for emitting lights of respective different brightness levels; and a liquid crystal display panel (22) having a display surface (24) provided which a light guide body (70). The light guide body (70) is a transparent optical member, and has a part covering at least a boundary line (26) between the main display region (27) and the sub display region (28a, 28b), when seen in a plan view. Further, the part of the light guide body (70) covering the boundary line (26) is formed to have a cross section having a curvature.

8 Claims, 16 Drawing Sheets

FIG. 6
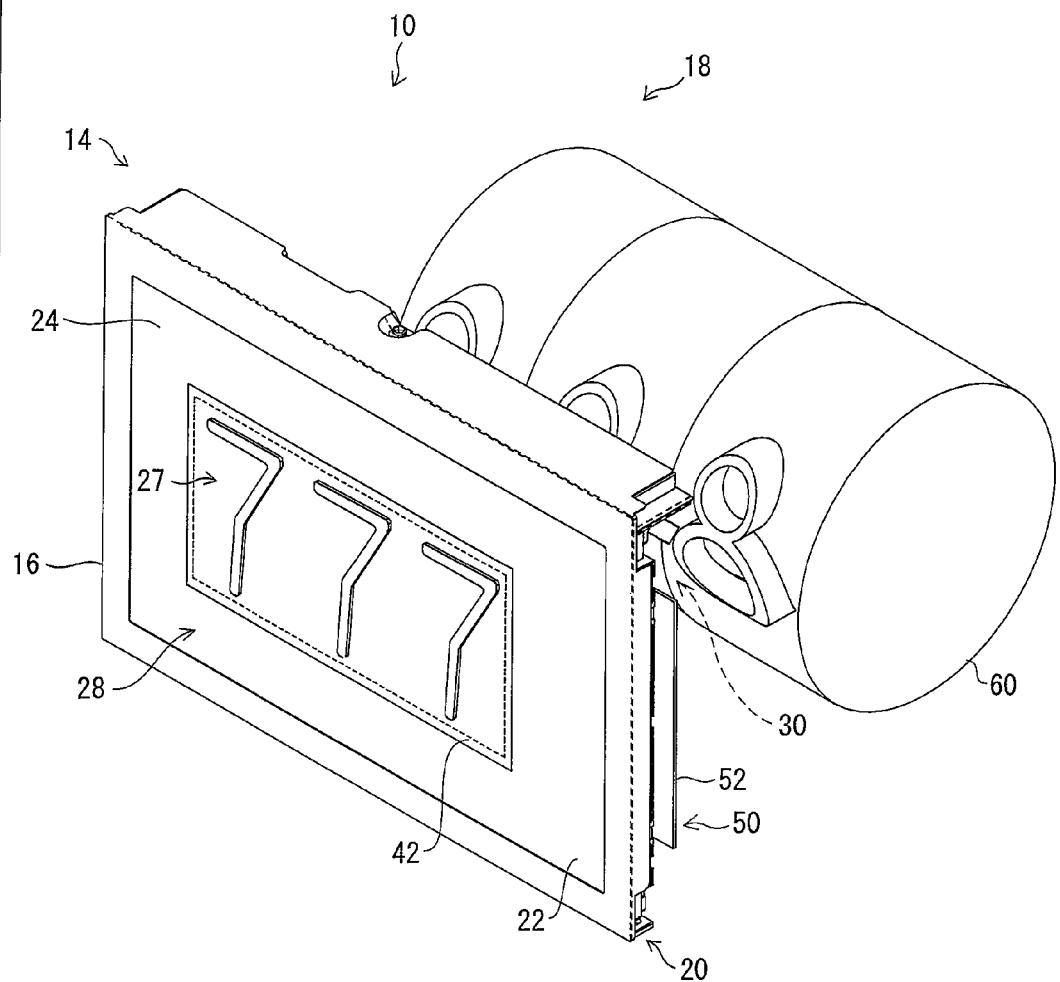
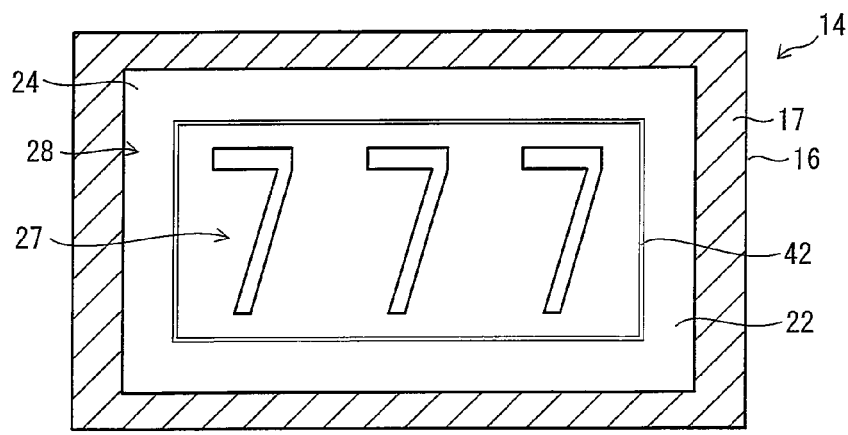

FIG. 9
(a)
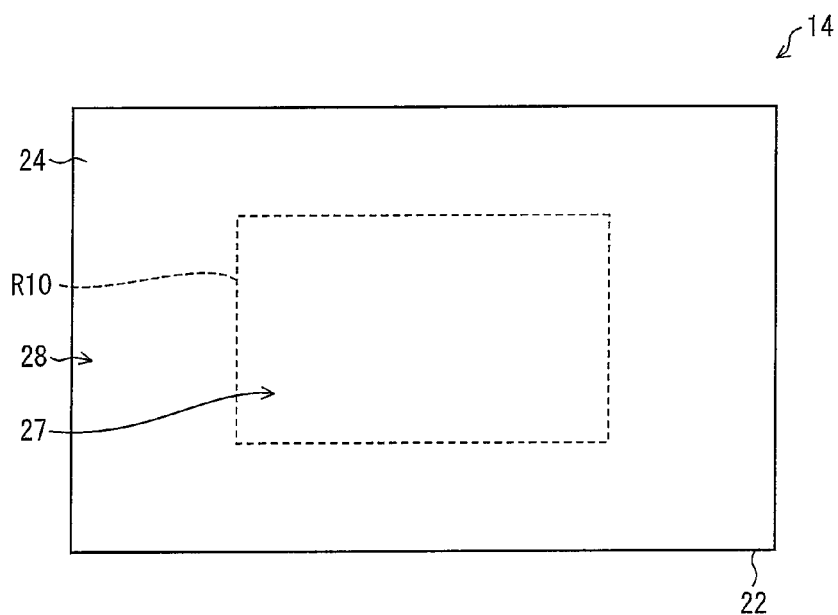
(b)
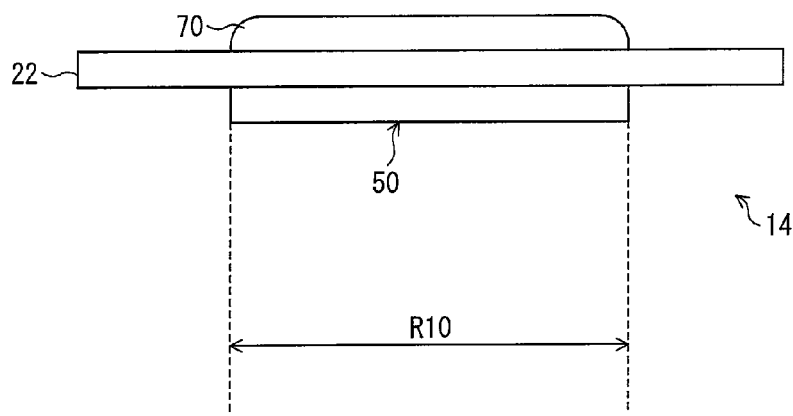

LIQUID CRYSTAL DISPLAY DEVICE AND GAME DEVICE

TECHNICAL FIELD

The present invention relates to a liquid crystal display device and a game device. Particularly, the present invention relates to: a liquid crystal display device capable of performing, in its display surface, a plurality of displays; and a game device including the liquid crystal display device.

BACKGROUND ART

Conventionally, many game devices such as pachinko (pinball) game devices use a liquid crystal display device as a component serving as an information display section thereof.

Recently, the game device is requested to display, in its information display section, (i) information displayed on a liquid crystal display panel of the liquid crystal display device and (ii) an accessory object and/or the like provided behind the liquid crystal display device, in such a manner as to arbitrary switch between display and non-display of the accessory object and/or the like. The following will give a description with reference to FIG. 11, which is a view schematically illustrating a configuration of a game device, and (a) and (b) of FIG. 12, each of which is a view illustrating a display indicated by an information display section of the game device.

As shown in FIG. 11, a game device 90 is provided with, on its front surface, a circular game board 92 with which it is possible to see how a game is going on. The game board 92 includes, in its substantially center region, an information display section 94, which is mainly made of a liquid crystal display panel of a liquid crystal display device.

The information display section 94 displays various kinds of information according to how the game is going on.

For example, in a typical game, the information display section 94 displays an image matching with the theme of the game device, as shown in (a) of FIG. 12. Further, depending on how the game is going on, the information display section 94 displays a three-digit number whose digits change as in a slot machine, as shown in (b) of FIG. 12.

(Patent Literature 1)

There have been proposed various configurations for enabling such displays.

FIG. 13 is a view schematically illustrating a configuration of a display device 100 for a game device, which is described in Patent Literature 1.

As shown in FIG. 13, for example, Patent Literature 1 describes the display device 100 for a game device, which display device 100 includes (i) a transparent liquid crystal display panel 110, (ii) a reel 120, and (iii) a shutter plate 130, which is provided between the transparent liquid crystal display panel 110 and the reel 120.

(Patent Literature 2)

Further, Patent Literature 2 describes a configuration including (i) an LCD shutter for image display, (ii) an accessory object, which is provided behind the LCD shutter for image display, and (iii) an LCD shutter for display switching, which is provided between the LCD shutter for image display and the accessory object.

(Polymer Dispersed Liquid Crystal Panel)

Here, used as (i) the shutter plate described in Patent Literature 1 or (ii) the LCD shutter for display switching described in Patent Literature 2 can be a so-called polymer dispersed liquid crystal panel.

The following will give a description with reference to (a) and (b) of FIG. 14, each of which is a view showing a state of light in a polymer dispersed liquid crystal panel. Here, (a) of FIG. 14 shows how light is transmitted while a voltage is applied to a liquid crystal layer, whereas (b) of FIG. 14 shows how light is transmitted while no voltage is applied to the liquid crystal layer.

The polymer dispersed liquid crystal panel 200 includes a first substrate 210, a second substrate 220, and a liquid crystal layer 230 containing small liquid crystal droplets 240, which liquid crystal layer 230 is sandwiched between the first substrate 210 and the second substrate 220.

As shown in (a) of FIG. 14, while a voltage is applied to the liquid crystal layer 230, liquid crystal molecules contained in the small liquid crystal droplets 240 in the liquid crystal layer 230 are oriented along the same direction. Consequently, light L is transmitted therethrough without being dispersed in the liquid crystal layer 230, whereby the polymer dispersed liquid crystal panel 200 comes into a so-called transparent state.

On the other hand, as shown in (b) of FIG. 14, while no voltage is applied to the liquid crystal layer 230, the liquid crystal molecules contained in the small liquid crystal droplets 240 in the liquid crystal layer 230 are oriented in random directions. Consequently, light L is dispersed in the liquid crystal layer 230, whereby the polymer dispersed liquid crystal panel 200 comes into a so-called opaque state.

As described above, the polymer dispersed liquid crystal panel 200 is switched between the transparent state and the opaque state. This makes it possible to switch between a visible state and an invisible state (non-shielded state and shielded state) for a reel, an accessory object, and/or the like provided behind the polymer dispersed liquid crystal panel 200.

(Patent Literature 3)

Patent Literature 3 describes, as a display device capable of displaying a plurality of images on its display surface, a display device including (i) a plurality of projectors, each of which serves as an image source, and (ii) a multi-screen.

CITATION LIST

Patent Literature

[Patent Literature 1]
Japanese Patent Application Publication, Tokukai, No. 2006-141559 A (Publication Date: Jun. 8, 2006)
[Patent Literature 2]
Japanese Patent Application Publication, Tokukai, No. 2005-185624 A (Publication Date: Jul. 14, 2005)
[Patent Literature 3]
Japanese Patent Application Publication, Tokukaihei, No. 6-123918 A (Publication Date: May 6, 1994)

SUMMARY OF INVENTION

Technical Problem

However, the conventional display device involve the following problem: In displaying a plurality of images on its display surface, display quality is likely to be impaired in a boundary region between the images. This will be described below with reference to FIGS. 15 through 18.

Each of FIGS. 15 and 16 is a view schematically illustrating a configuration of a liquid crystal display device 10. FIG. 15 shows the liquid crystal display device 10 viewed at an oblique angle, whereas FIG. 16 shows the liquid crystal display device 10 viewed from a side.

As shown in FIGS. 15 and 16, the liquid crystal display device 10 is mainly constituted by a display unit 14 and an accessory object section 18, which is provided behind the display unit 14. The display unit 14 is mainly constituted by a liquid crystal display section 20, a backlight unit 30, and a shutter section 50.

According to the above configuration, the liquid crystal display device 10 can select one of (i) a display showing a display on a liquid crystal display panel 22 provided in the liquid crystal display section 20, (ii) a display showing an accessory object 60 provided in the accessory object section 18, and (iii) a display showing a display on the liquid crystal display panel 22 and the accessory object 60, and show the selected one a main observer of the liquid crystal display device 10. The following will describe how each display is performed.

(Backlight Unit)

First, the backlight unit 30 will be described. As shown in FIG. 16, the backlight unit 30 is a so-called side light type backlight unit. Further, the backlight unit 30 has a light-emitting surface whose center region is hollowed out.

Specifically, the backlight unit 30 includes a light source 32 made of a fluorescent tube and/or the like, a light guide plate 34, and a diffusing plate 38. Each of the light guide plate 34 and the diffusing plate 38 has a center region which is hollowed out in a stripe shape.

The light-emitting surface of the backlight unit 30, which is shaped in a horizontally-long rectangle, includes a stripe-shaped region which is in parallel with a horizontal longer side of the backlight unit 30 and is located in a substantially center of the backlight unit 30 when viewed in a direction along a vertical shorter side of the backlight unit 30. In respective regions corresponding to the stripe-shaped region (i.e., in FIGS. 15 and 16, a region sandwiched between two boundary lines 26 (hollowed-out region R10)), the light guide plate 34 and the diffusing plate 38 do not exist.

In other words, a display surface 24, shaped in a horizontally-long rectangle, of the liquid crystal display section 20 is divided into three stripe-shaped regions by the two boundary lines 26, which are in parallel with horizontal sides of the display surface 24. Of the three regions, a region located in the center is a main display region 27, and regions located above and below the main display region 27 are a first sub display region 28a and a second sub display region 28b, respectively, the first sub display region 28a and the second sub display region 28b serving as a sub display region 28.

Behind the display surface 24, the backlight unit 30 is provided. Here, the light guide plate 34 and the diffusing plate 38 of the backlight unit 30 are provided behind the first sub display region 28a and the second sub display region 28b of the display surface 24, but are not provided behind the main display region 27.

Namely, a region behind the main display region 27 is the hollowed-out region R10.

(Shutter Section)

The shutter section 50 includes, as the polymer dispersed liquid crystal panel, a shutter liquid crystal panel 52.

Specifically, the polymer dispersed liquid crystal panel is not provided in an entire region behind the display surface 24, but is provided in a region behind the main display region 27. Namely, the shutter liquid crystal panel 52 is provided in a region corresponding to the hollowed-out region R10 of the backlight unit 30.

(Display Method)

According to the above configuration, the liquid crystal display device 10 can perform various displays. This will be described with reference to (a), (b), and (c) of FIG. 17, each of which shows a display performed by the liquid crystal display device 10.

The liquid crystal display device 10 can perform, for an observer of the liquid crystal display device 10, (i) a display (display mode 1) showing only a display on the liquid crystal display panel 22, (ii) a display (display mode 2) showing a display on the liquid crystal display panel 22 and the accessory object 60, and (iii) a display (display mode 3) showing only the accessory object 60.

(Display Mode 1)

In the display mode 1, illustrated in (a) of FIG. 17, for showing only a display on the liquid crystal display panel 22, the liquid crystal display panel 22 displays a desired image on its entire surface, and the shutter liquid crystal panel 52 is in an opaque state. Further, the light source 32 of the backlight unit 30 is turned on.

In this state, the accessory object 60, which is provided behind the shutter liquid crystal panel 52 being in the opaque state, is shielded and made invisible to the observer of the liquid crystal display device 10.

Consequently, to the observer, only the image displayed on the liquid crystal display panel 22 is shown.

During the display mode 1, in the main display region 27, the shutter liquid crystal panel 52 being in the opaque state serves as a light-emitting surface of a planer light source for emitting light to the liquid crystal display panel 22 from behind the liquid crystal display panel 22. On the other hand, in the sub display region 28, the light guide plate 34 and the diffusing plate 38 serve as a light-emitting surface of a planer light source for emitting light to the liquid crystal display panel 22 from behind the liquid crystal display panel 22.

(Display Mode 2)

Next, the following will describe the display mode 2, illustrated in (b) of FIG. 17, for showing both of a display on the liquid crystal display panel 22 and the accessory object 60.

In the display mode 2, the liquid crystal display panel displays desired images on respective regions corresponding to the first sub display region 28a and the second sub display region 28b.

On the other hand, the main display region 27 in the liquid crystal display panel 22 is in a transparent state, so that no image is displayed on the main display region 27. Furthermore, the shutter liquid crystal panel 52 is in a transparent state, so that the accessory object 60 provided behind the shutter liquid crystal panel 52 is not shielded and is made visible.

Note that, in this state, the light source 32 of the backlight unit 30 is turned on.

In this state, the observer can see the image displayed on the sub display region 28. At this time, the light guide plate 34 and the diffusing plate 38 of the backlight unit serve as a light-emitting surface of a planer light source for emitting light to the liquid crystal display panel 22 from behind the liquid crystal display panel 22.

On the other hand, in the main display region 27, both of the liquid crystal display panel 22 and the shutter liquid crystal panel 52 are transparent. Therefore, the observer can see the accessory object 60 therethrough.

(Display Mode 3)

Next, the following will describe the display mode 3, illustrated in (c) of FIG. 17, for showing only the accessory object 60.

In the display mode 3, the entire surface of the liquid crystal display panel 22 is in a transparent state, and no image is displayed thereon. Further, the shutter liquid crystal panel 52 is also in a transparent state, so that the accessory object 60 provided behind the shutter liquid crystal panel 52 is not shielded and is made visible.

Note that, in this state, the light source 32 of the backlight unit 30 is turned off.

In this state, the observer can see the accessory object 60 through the main display region 27.

(Bright Line)

As described above, the liquid crystal display device 10 can perform various displays. However, as described previously, in a case where a plurality of displays are performed on the display surface 24, a bright line appears at and around a boundary line between the displays, which results in an impairment in display quality.

Namely, in the above-described configuration, bright lines 42 (see the hatching parts in (a) and (b) of FIG. 17) appear (i) at and around a boundary line 26 between the main display region 27 and the first sub display region 28a and (ii) at and around a boundary line 26 between the main display region 27 and the second sub display region 28b.

Particularly while the light source 32 of the backlight unit 30 is turned on, the bright line 42, which appears at and around the boundary line 26, increases its intensity at and around an edge of the light guide plate (i.e., an edge surface 36 of the light guide plate), which edge is created as a result of hollowing-out of the light guide plate 34.

Even while the light source 32 of the backlight unit 30 is turned off, the bright line 42 is likely to appear, particularly in a case where a light source for accessory object illumination, which light source is for emitting light to the accessory object 60, is provided in the accessory object section 18 and the light source for the accessory object illumination is turned on. This is because that light emitted from the light source for the accessory object illumination reaches the light guide plate 34, and causes a similar phenomenon to that occurring while the light source 32 of the backlight unit 30 is turned on.

The following will give a description with reference to (a) and (b) of FIG. 18, each of which is a view illustrating a cross-sectional configuration of the display unit 14. Note that the arrow L shown in (b) of FIG. 18 indicates a light path of visible light.

As shown in (a) of FIG. 18, the liquid crystal display device 10 has the hollowed-out region R10, for which the light guide plate 34 is not provided.

Therefore, the light guide plate 34 has, at the edge surface 36, a boundary between the light guide plate 34 and a space. In this boundary, light is refracted and reflected considerably. This causes the bright line 42.

Namely, as shown in (b) of FIG. 18, particularly in the edge surface 36 of the light guide plate, visible light has a higher density.

Further, the bright line 42 is more outstandingly observed in a configuration including the shutter liquid crystal panel 52 provided in the hollowed-out region R10. The reason for this is as follows: Light relating to the bright line 42, which appears at and around the edge surface 36 of the light guide plate, is reflected by a surface of the shutter liquid crystal panel 52. As a result, the light is more likely to enter the eyes of the observer of the liquid crystal display device 10.

Furthermore, the bright line 42 is further more outstandingly observed in a configuration including a diffusing plate (not illustrated) provided for the backlight unit 30, which diffusing plate is also hollowed out in the same manner as for the light guide plate 34. This is because that a bright line 42 is likely to appear in an edge of the diffusing plate (i.e., an edge surface of the diffusing plate), as well as in the edge surface 36 of the light guide plate.

As described above, a configuration (e.g., the liquid crystal display device 10 described with reference to FIG. 15, etc. and the configurations described in Patent Literatures 1 and 2) for emitting lights of different intensities from a display surface to a main observer due to, e.g., the display surface including (i) a region for which a light guide plate is provided and (ii) a region for which the light guide plate is not provided has the problem of a bright line appearing at and around a boundary between these regions.

Furthermore, the configuration described in Patent Literature 3 includes the plurality of image sources. This makes the configuration complicated, which causes a problem of increasing cost.

The present invention was made in view of the foregoing problems, and an object of the present invention is to provide a liquid crystal display device and a game device each of which is capable of performing a plurality of displays in its display surface, with a simple configuration but without impairing display quality.

Particularly, an object of the present invention is to provide the liquid crystal display device and the game device each of which hardly allows observation of a bright line in a boundary between the displays on the display surface.

Solution to Problem

In order to solve the foregoing problems, a liquid crystal display device of the present invention is a liquid crystal display device, including: a liquid crystal display panel for displaying an image; and a backlight unit provided behind the liquid crystal display panel, the backlight unit including a light-emitting surface including at least two regions capable of emitting lights of respective different brightness levels, the liquid crystal display panel including a display surface including regions which correspond to respective said at least two regions and are capable of performing respective different displays, the display surface of the liquid crystal display panel being provided with an optical member which is transparent and has a part covering at least a boundary line between said at least two regions of the light-emitting surface of the backlight unit, when seen in a plan view, and the part of the optical member being formed to have a cross section having a curvature, which cross section is in a thickness direction of the optical member.

According to the above configuration, it is possible to provide a plurality of display regions in the display surface, and to cause the backlight unit to have different brightness levels for the respective display regions. Thus, with the above configuration, it is possible to perform a wide variety of displays.

Furthermore, according to the above configuration, the transparent optical member having a curvature is provided on the display surface of the liquid crystal display panel so as to cover the boundary line between the regions.

Therefore, light emitted from a region at and around the boundary line is reflected by the curved surface of the optical member, before reaching an observer of the liquid crystal display device. Consequently, the light travels in various directions in a wide range. In other words, the light emitted from the region at and around the boundary line becomes easy to disperse.

As a result, it is possible to reduce a rapid change in luminance in the boundary line between the regions having different brightness levels.

Thus, according to the above configuration, it is possible to provide a liquid crystal display device capable of performing a plurality of displays in its display surface, with such a simple configuration that an optical member is provided on the display surface, but without impairing display quality.

Further, the liquid crystal display device of the present invention can be configured such that: the backlight unit includes a light guide plate; a region of the light guide plate is hollowed out, so as to provide said at least two regions capable of emitting lights of respective different brightness levels; and the boundary line corresponds to an edge surface of the light guide plate, the edge surface being created by hollowing out the region of the light guide plate.

According to the above configuration, a region of the light guide plate of the backlight unit is hollowed out. This allows the observer of the liquid crystal display device to see not only an image on the liquid crystal display panel but also a space behind the backlight unit. Namely, the display surface can perform not only a display showing an image displayed on the liquid crystal display panel but also a display showing an actual object provided behind the backlight unit. Thus, the above configuration can show, to the observer of the liquid crystal display device, a display with strong visuals.

Here, at and around the edge surface, which has been created by hollowing out the region of the light guide plate, a rapid change in luminance may occur, so that a bright line is likely to appear along the edge surface.

In order to avoid this, according to the above configuration, the transparent optical member having a curvature is provided in a part of the display surface of the liquid crystal display panel which part covers the edge surface. This makes it possible to (i) reduce a change in luminance at and around the edge surface and (ii) make a bright line inconspicuous.

Thus, according to the above configuration, it is possible to provide a liquid crystal display device which hardly allows observation of a bright line and/or the like in a boundary between displays on a display surface of the liquid crystal display device.

Further, the liquid crystal display device of the present invention is preferably configured such that: the optical member is provided so as to cover the hollowed-out region of the light guide plate, when seen in a plan view.

According to the above configuration, the hollowed-out region of the light guide plate is covered with the optical member. This makes it possible to reduce a rapid change in luminance in the hollowed-out region.

Namely, if the hollowed-out region includes (i) a part covered with the optical member and (ii) a part not covered with the optical member, display conditions in the respective parts may differ from each other. Furthermore, another bright line and/or the like may occur in a boundary region between these parts.

On the other hand, according to the above configuration, the hollowed-out region is covered with the optical member; therefore, it is possible to prevent the difference in the display condition or occurrence of another bright line.

Further, the liquid crystal display device of the present invention can include: an accessory object provided behind the backlight unit; and a shutter liquid crystal panel for shielding the accessory object, the shutter liquid crystal panel being provided in a region between the backlight unit and the accessory object so as to cover the hollowed-out region of the light guide plate.

The above configuration includes (i) the accessory object and (ii) the shutter liquid crystal panel capable of shielding the accessory object. Therefore, the above configuration can show, to the observer, not only an image on the liquid crystal display panel but also the accessory object, which is an actual object.

Thus, the above configuration can perform a display with strong visuals.

Further, the liquid crystal display device of the present invention can be configured such that: the shutter liquid crystal panel is a polymer dispersed liquid crystal panel.

According to the above configuration, the shutter liquid crystal panel is made of the polymer dispersed liquid crystal panel. Thus, it is possible to switch between display and non-display of the accessory object with a simple configuration.

Furthermore, according to the above configuration, it is possible to clearly show the accessory object while the display mode for the accessory object is set to be "display", and to adequately shield the accessory object while the display mode for the accessory object is set to be "non-display".

Further, the liquid crystal display device of the present invention is preferably configured such that: the optical member, which is transparent, has a light transmittance of 80% or more.

According to the above configuration, the optical member has a light transmittance of 80% or more. Therefore, the observer of the liquid crystal display device hardly notices the existence of the optical member. Thus, it is possible to prevent a reduction in clearness of a displayed image, which reduction may be caused by the optical member provided.

Further, the liquid crystal display device of the present invention is preferably configured such that: a radius of the curvature is 10 mm or more and not more than 100 mm.

According to the above configuration, the radius of the curvature is 10 mm or more and not more than 100 mm. With this, in a boundary between regions having respective different brightness levels, it is possible to more efficiently reduce a rapid change in luminance and prevent occurrence of a bright line.

Further, a game device of the present invention preferably includes the above-described liquid crystal display device.

According to the above configuration, it is possible to display a plurality of images, while preventing a boundary between display regions from being recognized. Thus, it is possible to provide a game device having a higher quality and a greater impact.

Advantageous Effects of Invention

As described above, a liquid crystal display device of the present invention includes: a liquid crystal display panel for displaying an image; and a backlight unit provided behind the liquid crystal display panel, the backlight unit including a light-emitting surface including at least two regions capable of emitting lights of respective different brightness levels, the liquid crystal display panel including a display surface including regions which correspond to respective said at least two regions and are capable of performing respective different displays, the display surface of the liquid crystal display panel being provided with an optical member which is transparent and has a part covering, when seen in a plan view, at least a boundary line between said at least two regions of the light-emitting surface of the backlight unit, and the part of the optical member being formed to have a cross section having a curvature, which cross section is in a thickness direction of the optical member.

Thus, it is possible to provide a liquid crystal display device capable of performing a plurality of displays in its display surface, with a simple configuration but without impairing display quality.

BRIEF DESCRIPTION OF DRAWINGS

FIG. 6 is a view schematically illustrating a configuration of a liquid crystal display device. (a) of FIG. 6 shows the liquid crystal display device viewed at an oblique angle, and (b) of FIG. 6 shows a display condition of a display surface of the liquid crystal display device.

FIG. 9 is a view schematically illustrating a configuration of the liquid crystal display device of said another embodiment of the present invention. (a) of FIG. 9 shows a front view of the liquid crystal display device, and (b) of FIG. 9 shows a bottom view of the liquid crystal display device.

DESCRIPTION OF EMBODIMENTS

Embodiment 1

The following will describe one embodiment of the present invention with reference to figures.

(Configuration of Liquid Crystal Display Device)

Figure 1:
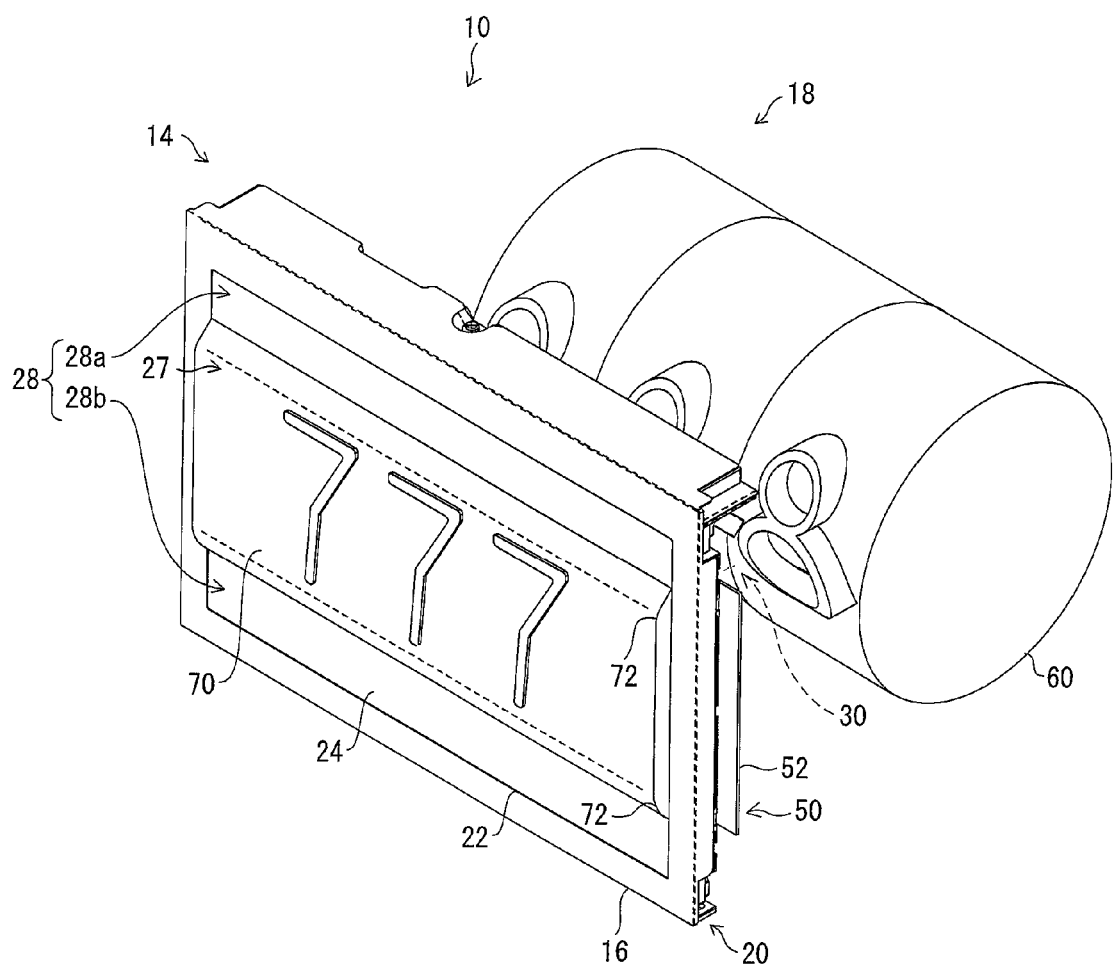
FIG. 1 is a perspective view schematically illustrating a configuration of a liquid crystal display device of one embodiment of the present invention.
Figure 2:
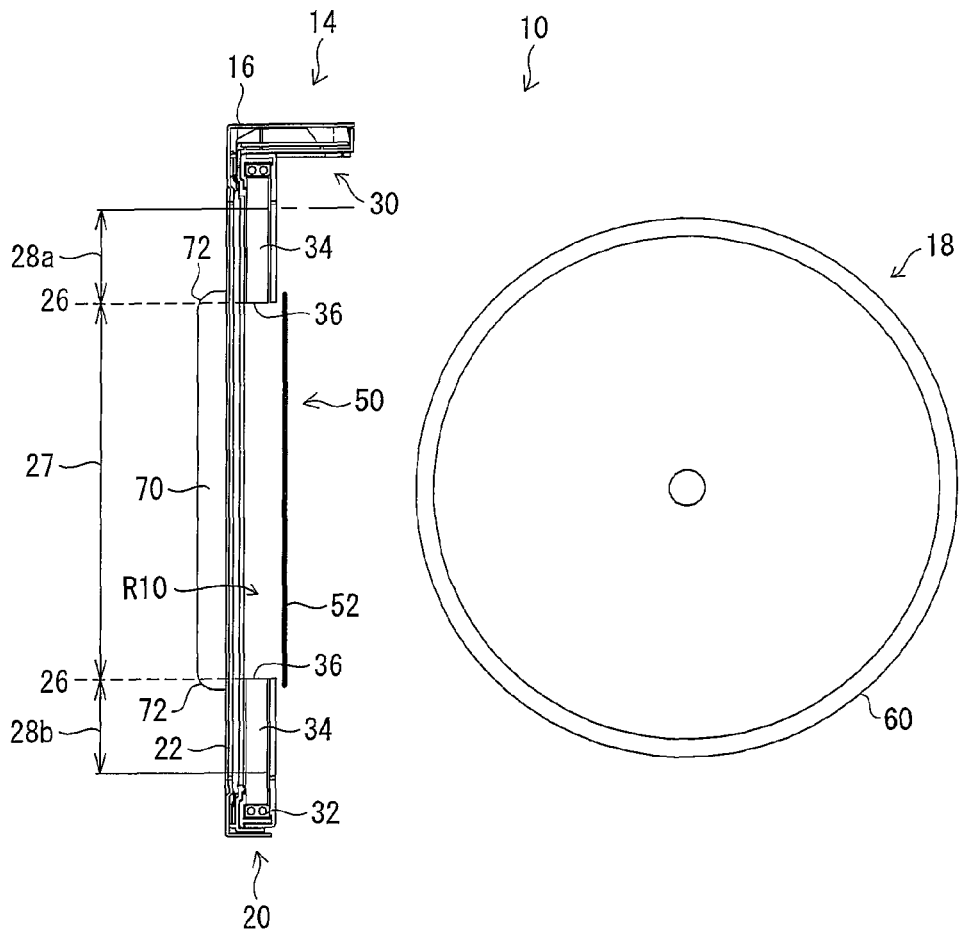
FIG. 2 is a side view schematically illustrating the configuration of the liquid crystal display device of the one embodiment of the present invention.

First, the following will schematically describes a configuration of a liquid crystal display device 10 of the present embodiment with reference to FIGS. 1 and 2. Each of FIGS. 1 and 2 is a view schematically illustrating a configuration of the liquid crystal display device 10 of the present embodiment. FIG. 1 shows the liquid crystal display device 10 viewed at an oblique angle, whereas FIG. 2 shows the liquid crystal display device 10 viewed from a side.

Figure 15:
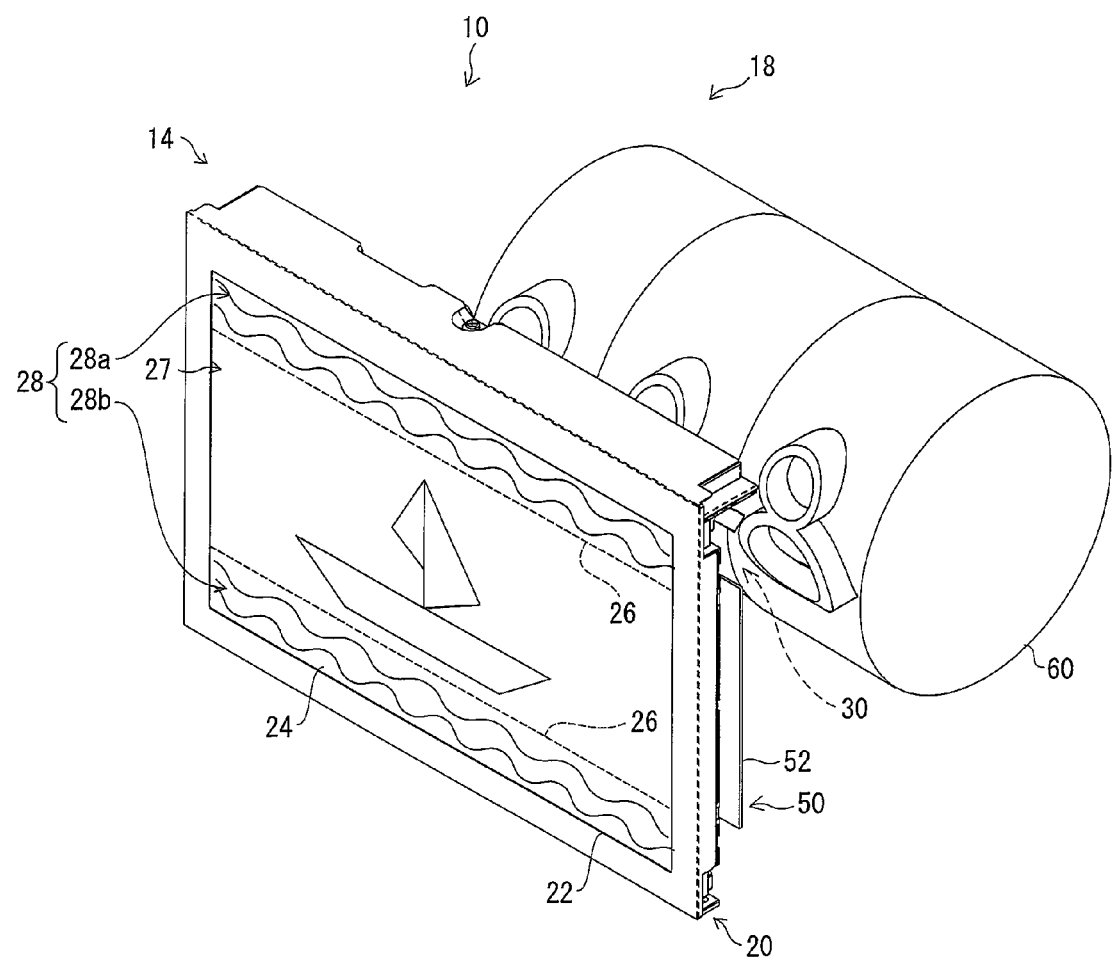
FIG. 15 is a view schematically illustrating a configuration of a liquid crystal display device.
Figure 16:
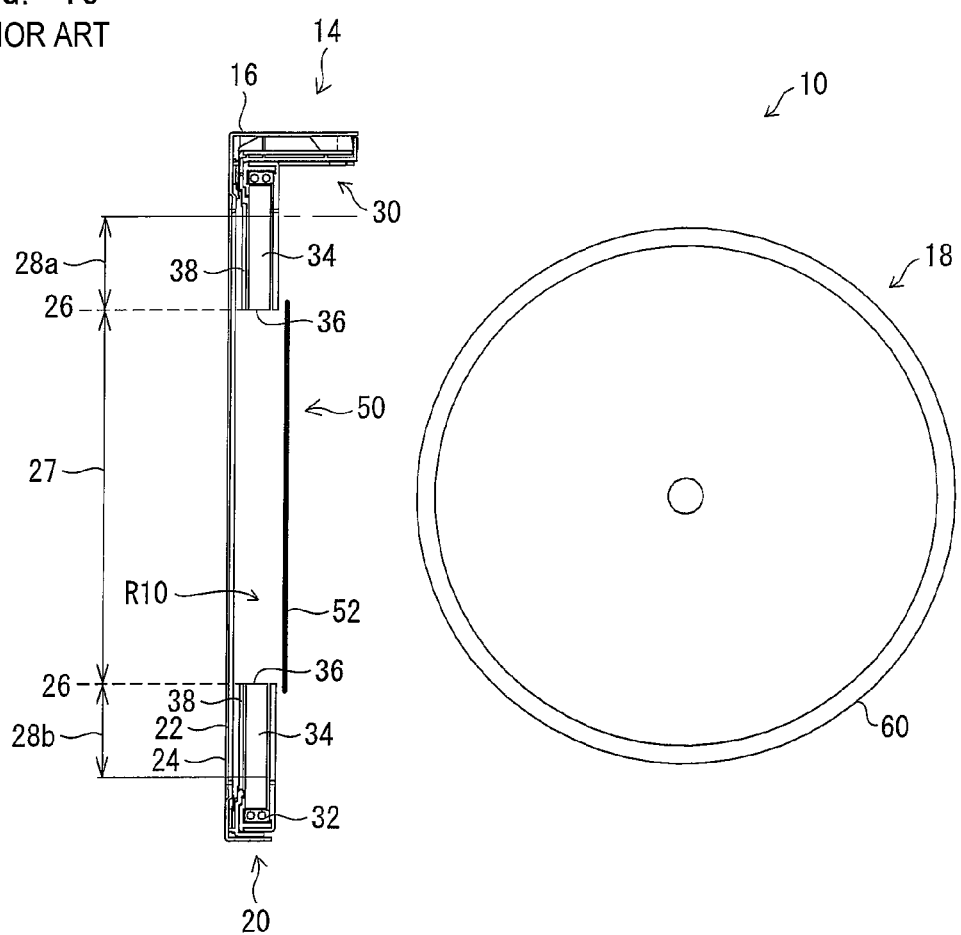
FIG. 16 is a view schematically illustrating a configuration of the liquid crystal display device.
Figure 17:
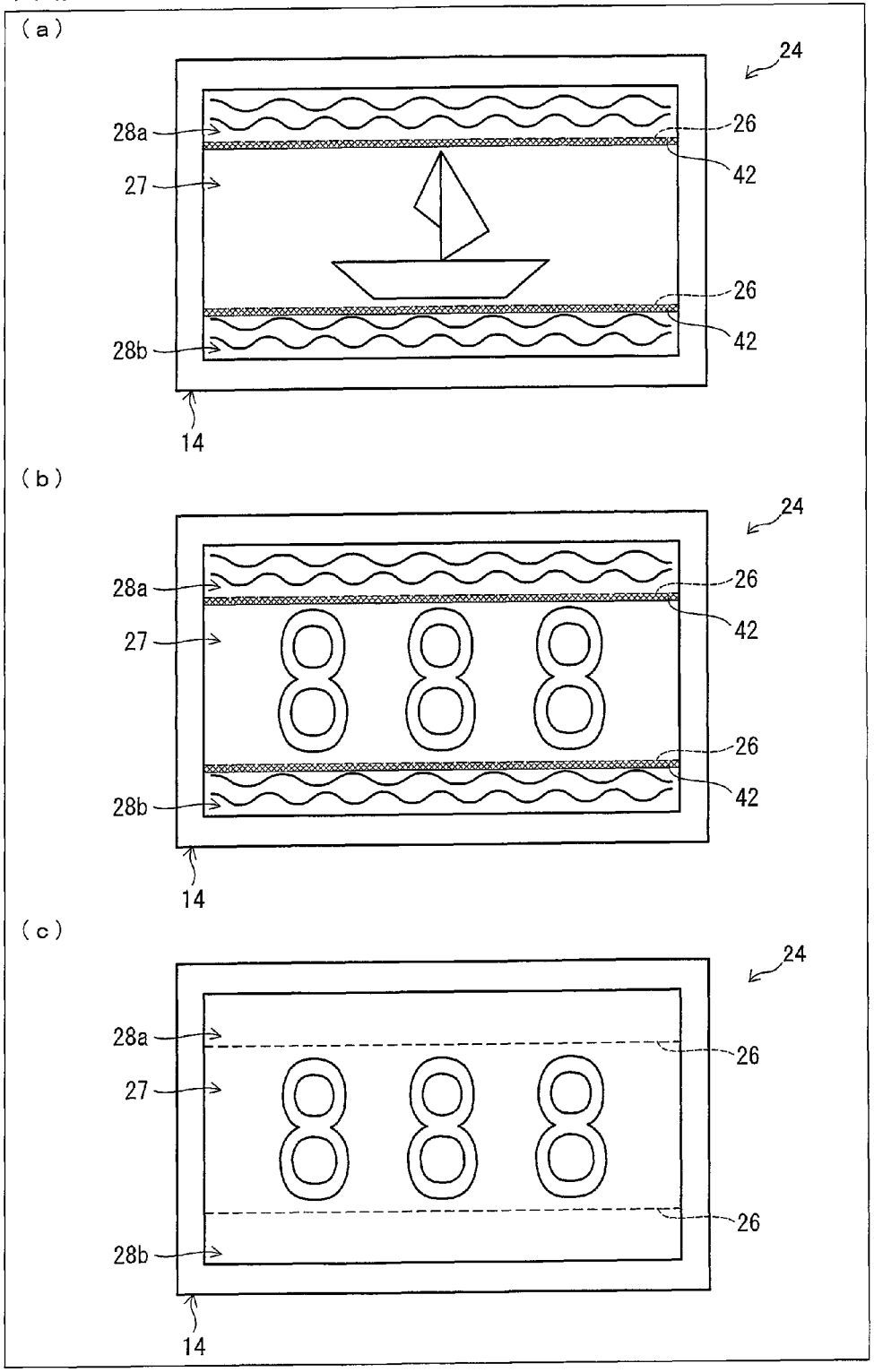
FIG. 17 is a view illustrating display conditions of the liquid crystal display device. (a) of FIG. 17 shows a display mode 1, (b) of FIG. 17 shows a display mode 2, and (c) of FIG. 17 shows a display mode 3.

As shown in FIG. 1, the liquid crystal display device 10 of the present embodiment has a similar configuration to that of the liquid crystal display device 10 which is previously explained with reference to FIG. 15, etc.

Namely, as shown in FIGS. 1 and 2, the liquid crystal display device 10 of the present embodiment is mainly constituted by a display unit 14 and an accessory object section 18, which is provided behind the display unit 14.

(Accessory Object Section)

The accessory object section 18 includes an accessory object 60, which is a subject whose entity is desired to be directly shown to an observer of the liquid crystal display device 10. The configuration shown in FIGS. 1 and 2 includes a reel as an example of the accessory object 60, which reel indicates numbers as by a slot machine.

(Display Unit)

On the other hand, the display unit 14 is mainly constituted by a liquid crystal display section 20, a backlight unit 30, and a shutter section 50, each of which will be described below.

(Liquid Crystal Display Section)

The liquid crystal display section 20 includes a liquid crystal display panel 22 serving as a display surface 24.

(Backlight Unit)

The backlight unit 30 is provided as a side-light type backlight unit, and has a light-emitting surface whose center region is hollowed out.

Specifically, the backlight unit 30 includes a light source 32 made of a fluorescent tube and/or the like, a light guide plate 34, and a diffusing plate (not illustrated). Each of the light guide plate 34 and the diffusing plate has a center region which is hollowed out in a stripe shape.

The light-emitting surface of the backlight unit 30 of the present embodiment is shaped in a substantially horizontally-long rectangle. The backlight unit 30 includes a stripe-shaped region which is in parallel with a horizontal longer side of the backlight unit 30 and is located in a substantially center of the backlight unit 30 when viewed in a direction along a vertical shorter side of the backlight unit 30. In respective regions corresponding to the stripe-shaped region, the light guide plate and the diffusing plate 38 do not exist (hollowed-out region R10). This configuration provides, in the light-emitting surface of the backlight unit 30, regions from which lights of respective different brightness levels can be emitted.

Namely, (i) light emitted from a region of the light-emitting surface corresponding to the region in which the light guide plate 34 exists is brighter than (ii) light emitted from a region of the light-emitting surface corresponding to the hollowed-out region R10, i.e., the region in which the light guide plate 34 does not exist.

A boundary between (i) the region in which the light guide plate 34 exists and (ii) the region in which the light guide plate 34 does not exist corresponds to a boundary line 26. Namely, the boundary line 26 corresponds to a periphery edge of the hollowed-out region R10.

In the present embodiment, the hollowed-out region R10 is provided so as (i) to be in parallel with the horizontal longer side of the backlight unit 30 and (ii) to correspond to the center region of the backlight unit 30 when viewed in the direction along the vertical shorter side of the backlight unit 30. Therefore, two boundary lines 26 are provided on the display surface 24 of the liquid crystal display panel 22 so that the boundary lines 26 are in parallel with the horizontal longer side of the backlight unit 30.

The display surface 24 is divided into three stripe-shaped regions by the two boundary lines 26. Of the three regions, a region located in the center is a main display region 27, and regions located above and below the main display region 27 are a first sub display region 28a and a second sub display region 28b, respectively, the first sub display region 28a and the second sub display region 28b serving as a sub display region 28.

Namely, a region behind the display surface 24 includes (i) a region behind the first sub display region 28a and a region behind the second sub display region 28b, in each of which regions the light guide plate 34 and the diffusing plate are provided, and (ii) a region behind the main display region 27, in which region the light guide plate 34 and the diffusing plate are not provided.

In other words, the region behind the main display region 27 is the hollowed-out region R10. Further, as described above, in the region behind the main display region 27, the light guide plate 34 and the like are not provided. Therefore, light emitted by the backlight unit 30 is likely to have different brightness levels in (i) the main display region 27 and (ii) the sub display region 28 (the first sub display region 28a, the second sub display region 28b).

(Shutter Section)

Next, the following will describe the shutter section 50.

In the display unit 14, the shutter section 50 is provided behind the backlight unit 30.

Further, the shutter section 50 includes, as a shutter liquid crystal panel 52, a polymer dispersed liquid crystal panel having a similar configuration to the previously-explained one.

Specifically, the shutter liquid crystal panel 52 is provided so as to cover the hollowed-out region R10 of the backlight unit 30.

Figure 3:
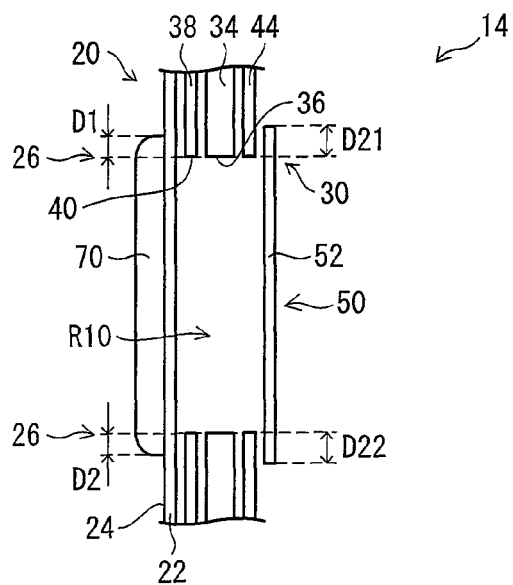
FIG. 3 is a cross-sectional view schematically illustrating the configuration of the liquid crystal display device of the one embodiment of the present invention.

FIG. 3 is a cross-sectional view illustrating the configuration of the liquid crystal display device 10 of the present embodiment. More specifically, FIG. 3 shows a model arrangement of members provided in the vicinity of the hollowed-out region R10, particularly, the shutter liquid crystal panel 52 and a light guide body 70 (described later).

As shown in FIG. 3, the shutter liquid crystal panel 52 is provided so as to extend over the two boundary lines 26, and the shutter liquid crystal panel 52 and the light guide plate 34 are partially overlapped with each other.

Namely, each of widths (D21 and D22 shown in FIG. 3) in which the shutter liquid crystal panel 52 and the light guide plate 34 are overlapped with each other has a positive value.

(Light Guide Body)

A characteristic point of the liquid crystal display device 10 of the present embodiment is the light guide body 70, which is provided on the display surface 24 of the liquid crystal display section 20 as a transparent optical member.

Namely, as shown in FIG. 1, the light guide body 70, which is in the form of a shape covering the main display region 27 almost entirely, specifically, in the form of a horizontally-long rectangle, is provided on the display surface 24 of the liquid crystal display panel 22.

The light guide body 70 is transparent, and is formed so as to be substantially in the form of the letter "D" in cross section. Further, the light guide body 70 is made of a transparent acrylic material. More specifically, on the display surface 24, the light guide body 70 is provided so as to cover the hollowed-out region R10.

Of edge parts of the light guide body 70, an edge part facing the boundary line 26 is formed to have a curved surface. In other words, the light guide body 70 is formed to have a cross section having a curvature, which cross section is in a thickness direction of the light guide body 70.

Namely, as shown in FIG. 1, of the four sides of the substantially rectangular light guide body 70, two sides facing the respective boundary lines 26 are provided with their corresponding curved surface sections 72.

Note that the transparent optical member is not limited to any specific type, as long as an image can be recognized through the optical member. For example, the transparent optical member is preferably a material having a transmittance of 80% or more, particularly preferably, a transparent acrylic material or the like.

(Position of Light Guide Body)

The following will give a further concrete description with reference to FIG. 3, which is a cross-sectional view illustrating the configuration of the liquid crystal display device 10 of the present embodiment.

As shown in FIG. 3, the backlight unit 30 includes not only the light guide plate 34 (previously described with reference to FIG. 1), but also (i) the diffusing plate 38, which is provided between the light guide plate 34 and the liquid crystal display panel 22, and (ii) a backlight chassis 44, which is provided behind the light guide plate 34.

As well as the light guide plate 34, each of the diffusing plate 38 and the backlight chassis 44 also has a region which corresponds to the main display region 27 and is hollowed out. Accordingly, the diffusing plate 38 has an edge surface 40, which is an edge surface created as a result of the hollowing-out similarly to the edge surface 36 of the light guide plate 34.

As described previously, the light guide body 70 is provided so as to cover the hollowed-out region R10. Specifically, the edge sections of the light guide body 70 are positioned so as to cover the boundary lines 26 between the hollowed-out region R10 and the light guide plate 34.

Namely, preferably, the light guide body 70 is provided on the display surface 24 of the liquid crystal display panel 22 so that each of widths D1 and D2 (shown in FIG. 3) in which the light guide plate 34 and the light guide body 70 are overlapped with each other has a positive value.

There are by no means any particular limitations as to a method of fixing the light guide body 70 in the display unit 14, and any appropriate method is applicable.

For example, the light guide body 70 may be provided on the display surface 24 of the liquid crystal display panel 22 through use of an adhesive or a pressure sensitive adhesive, or may be directly fixed to a display unit chassis 16 (e.g., to a bezel) in the display unit 14.

(Making Blight Line Inconspicuous)

As described above, the display surface 24 of the liquid crystal display panel 22 is provided with the light guide body 70. This makes it possible to prevent direct light emission from the hollowed-out region R10, which is not light transmission via the light guide body 70. Further, this makes it possible to make a bright line 42, which appears at and around the boundary line 26, more inconspicuous.

This will be described with reference to FIG. 4, which is a view illustrating a cross-sectional configuration of the display unit 14. The arrow L in FIG. 4 indicates a light path of visible light, as well as in (b) of FIG. 18.

Figure 4:
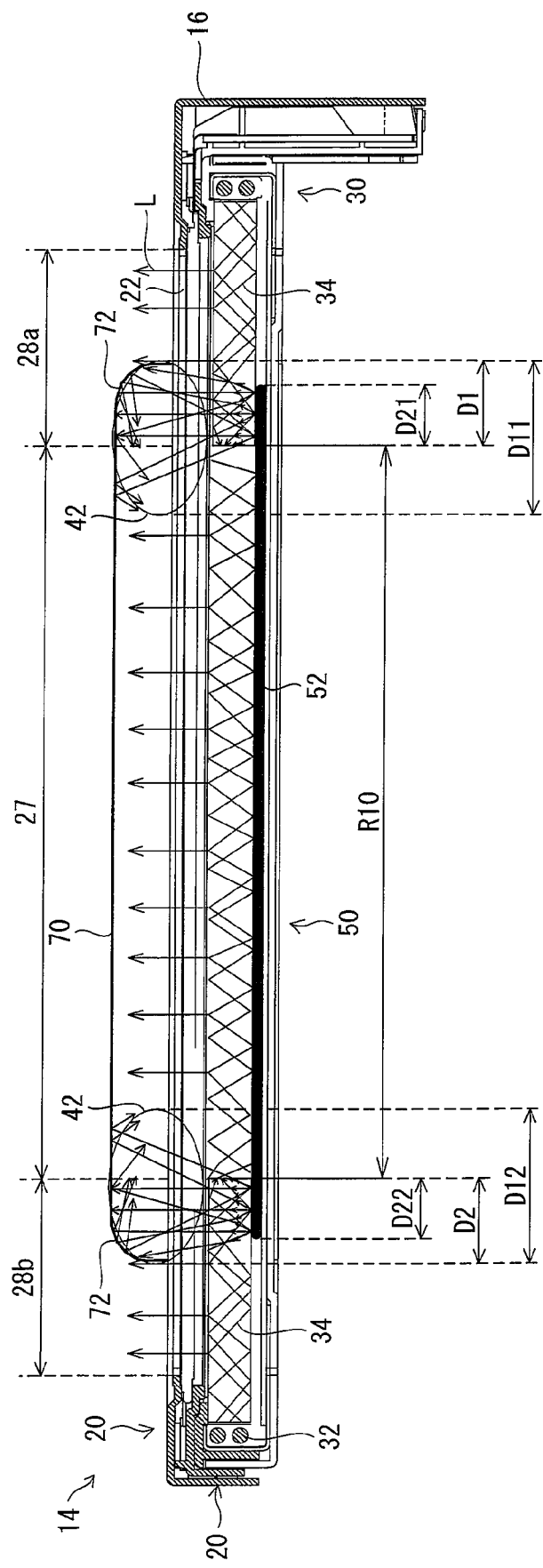
FIG. 4 is a view illustrating a cross-sectional configuration of a display unit of the one embodiment of the present invention.

As shown in FIG. 4, in the liquid crystal display device 10 of the present embodiment, the light guide body 70 is provided on the display surface 24 of the liquid crystal display panel 22 so as to cover the hollowed-out region R10. Further, each of the edge sections (the curved surface sections 72) of the light guide body 70 is formed so as to have a predetermined curvature.

Figure 18:
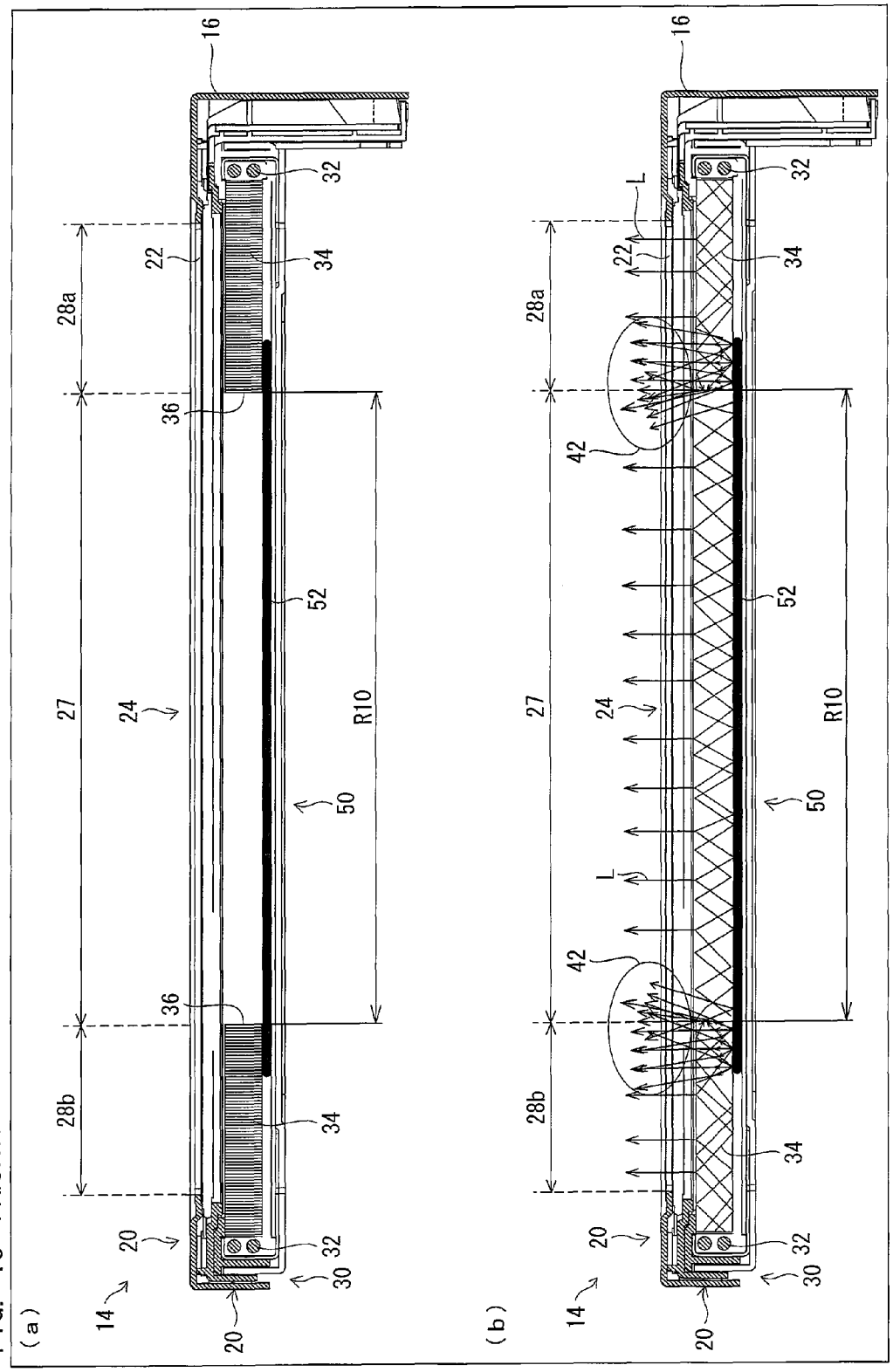
FIG. 18 is a view illustrating a cross-sectional configuration of a display unit. (a) of FIG. 18 mainly shows a schematic configuration of the display unit, and (b) of FIG. 18 mainly shows a light path of visible light.

Specifically, parts of the light guide body 70 which parts cover the corresponding bright lines 42 (previously described with reference to (b) of FIG. 18) appearing at and around the boundary lines 26 are the curved surface sections 72, respectively.

In particular, parts of the light guide body 70 which parts correspond to respective widths (D11 and D12 shown in FIG. 4) of the bright lines 42 are the curved surface sections 72, respectively, each of the curved surface sections 72 having a curvature.

Accordingly, when emitted toward a main observer of the liquid crystal display device 10, visible light (i.e., the bright line 42) having a higher density at and around an edge of the light guide plate 34 (i.e., the edge surface 36 of the light guide plate) reaches an inner wall of the curved surface section 72 of the light guide body 70. Then, light relating to the bright line 42 is reflected by the inner wall. The light reflected by the inner wall surface propagates through the light guide body 70, since the inner wall of the curved surface section 72 has a curvature.

As a result, light emission is not performed such that only light at and around the boundary line 26 has a higher density, but is likely to be performed with almost uniform densities over the entire region of the light guide body 70. Thus, it is possible to make the bright line 42 inconspicuous at and around the boundary line 26.

(Thickness, Curvature)

The light guide body 70 is not particularly limited in terms of a thickness and a curvature. For example, the light guide body 70 may have a thickness of 8 mm and a curvature radius R of 60 mm, or may have a thickness of 6 mm and a curvature radius R of 33 mm.

Note that the thickness of the light guide body 70 is preferably 4 mm or more and not more than 20 mm. Basically, the thickness of the light guide body 70 is preferably 10 mm with respect to 1 mm of the light-emitting region.

The curvature radius R of the light guide body 70 is preferably 10 mm or more and not more than 100 mm.

(Material)

The light guide body 70 is not particularly limited in terms of a material. The material of the light guide body 70 may be any material, as long as it is a transparent material having a light-transmitting property and allowing observation of a space behind the light guide body 70. Such the material may be either an organic material or an inorganic material.

For example, the material of the light guide body 70 may be a transparent acrylic material, because of its transparency, ease of molding and processing, and the like.

Note that the material of the light guide body 70 is not limited to the acrylic material. Instead, the material of the light guide body 70 may be any organic material such as a high-molecular material or any inorganic material such as a glass, as long as the material is transparent.

(Display Quality)

Figure 5:
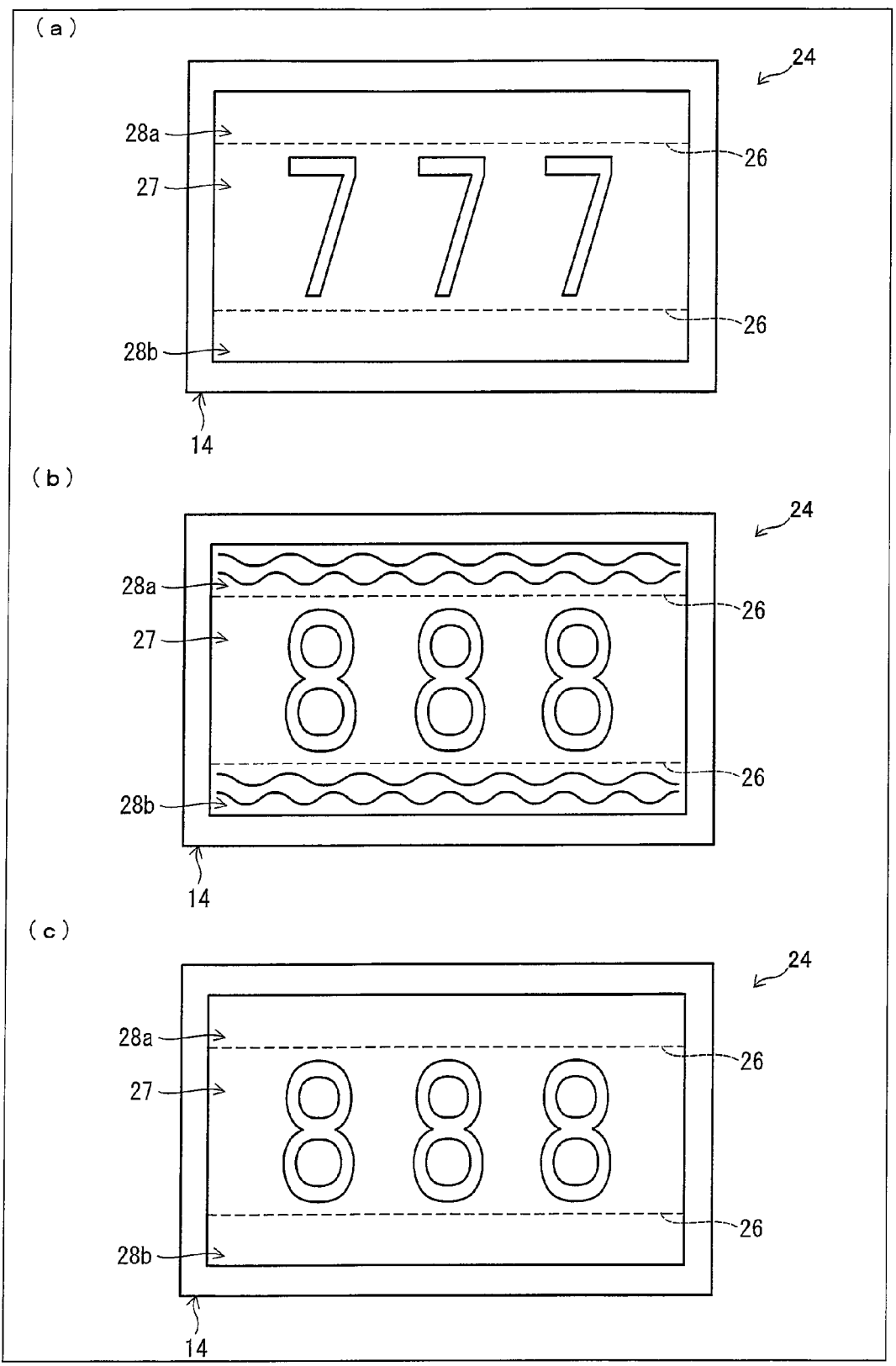
FIG. 5 is a view illustrating displays performed by the liquid crystal display device of the one embodiment of the present invention. (a) of FIG. 5 illustrates a display showing only a display on the liquid crystal display panel, (b) of FIG. 5 illustrates a display showing a display on the liquid crystal display panel and an accessory object, and (c) of FIG. 5 is a display showing only the accessory object.

Next, with reference to (a), (b), and (c) of FIG. 5, the following will describe displays performed by the liquid crystal display device 10 of the present embodiment. Each of (a), (b), and (c) of FIG. 5 is a view illustrating a display performed by the liquid crystal display device 10 of the present embodiment.

In the liquid crystal display device 10 of the present embodiment, the light guide body 70 having a curvature is provided on the display surface 24 of the liquid crystal display panel so as to cover the boundary lines 26 of the hollowed-out region R10.

Accordingly, the bright lines 42 are made inconspicuous, so that the bright lines are invisible or are hardly observed.

Consequently, as shown in (a) of FIG. 5, in a case where only a display on the liquid crystal display panel 22 in the display unit 14 is shown, no bright line 42 is observed. As a result, (i) a boundary between the main display region 27 and the first sub display region 28a and (ii) a boundary between the main display region 27 and the second sub display region 28b are hardly recognized.

Alternatively, as shown in (b) of FIG. 5, it is possible to show the accessory object 60 together with a display on the liquid crystal display panel 22.

Namely, in this case, the shutter liquid crystal panel 52 is bought into a transparent state so as to make the accessory object 60 visible. This causes the main display region 27 to display the accessory object 60.

Meanwhile, each of the first sub display region 28a and the second sub display region 28b of the liquid crystal display panel 22 displays content which is desired to be shown to the observer.

Thus, it is possible to display (i) the accessory object 60 via the main display region 27 and (ii) any image via the sub display region 28 (the first sub display region 28a, the second sub display region 28b).

Also in this case, no bright line 42 is observed between the main display region 27 and the sub display region 28.

Further alternatively, as shown in (c) of FIG. 5, it is possible to show the accessory object 60.

Namely, as with the case of (b) of FIG. 5, the shutter liquid crystal panel 52 is brought into a transparent state so as to make the accessory object 60 visible.

Meanwhile, nothing is displayed on the first sub display region 28a and the second sub display region 28b of the liquid crystal display panel 22.

This makes it possible to display the accessory object 60 via the main display region 27, and leads to a state where nothing is displayed on the sub display region 28 (the first sub display region 28a, the second sub display region 28b).

Also in this case, as well as in the above-described displays, no bright line 42 is observed between the main display region 27 and the sub display region 28.

As described above, with the liquid crystal display device 10 of the present embodiment, it is possible to perform a display in which a boundary between the display regions is made invisible, i.e., a so-called seamless display.

Embodiment 2

Figure 7:
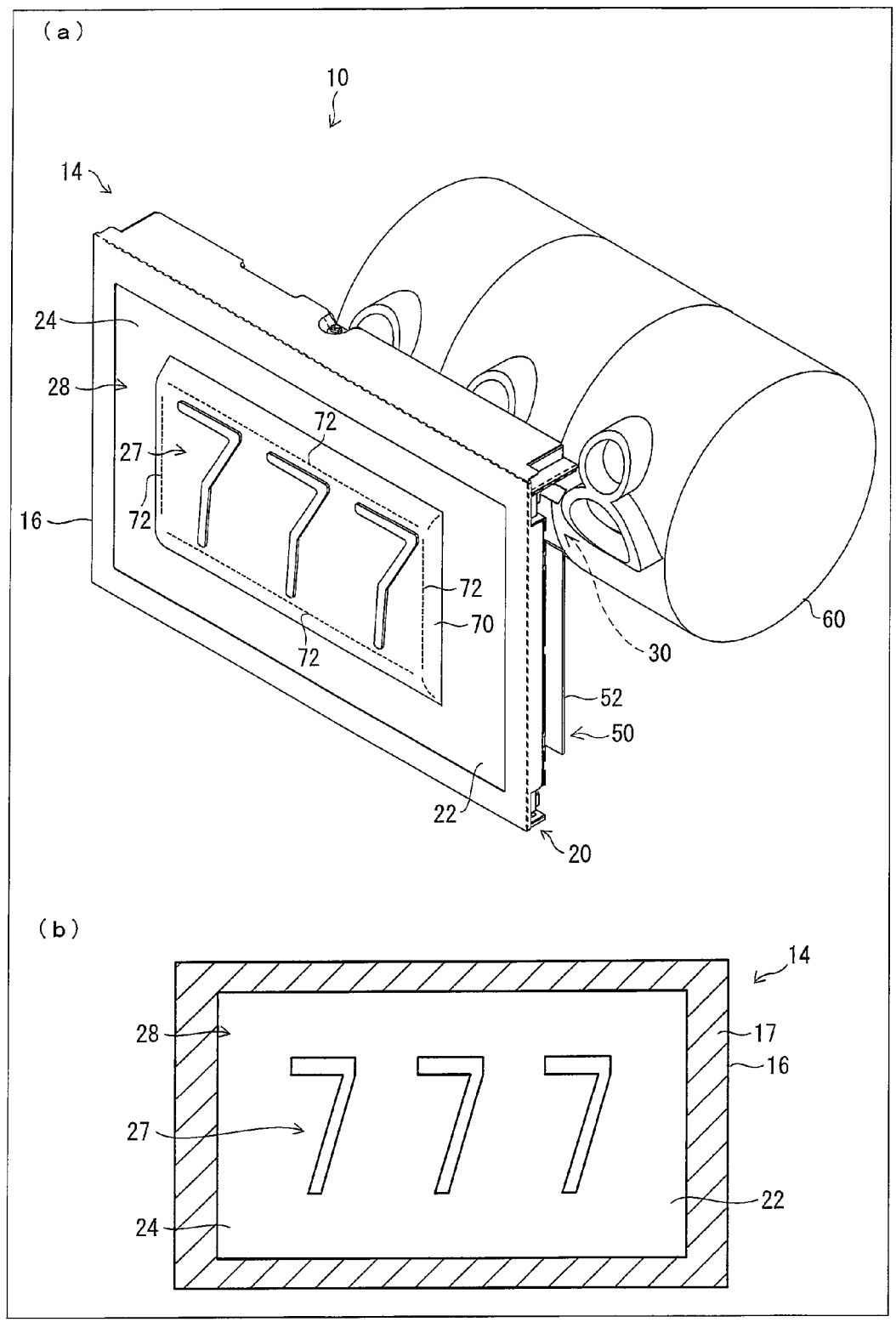
FIG. 7 is a view schematically illustrating a configuration of a liquid crystal display device of another embodiment of the present invention. (a) of FIG. 7 shows the liquid crystal display device viewed at an oblique angle, and (b) of FIG. 7 shows a display condition of a display surface of the liquid crystal display device.

The following will describe another embodiment of the present invention with reference to (a) of FIG. 6, (a) of FIG. 7, etc. Note that the present embodiment is equal to Embodiment 1, except for features described in the present embodiment. Further, for convenience of explanation, members having the same functions as those explained in drawings of Embodiment 1 are given the same signs as Embodiment 1 and explanations thereof are omitted here.

Unlike in the liquid crystal display device 10 of Embodiment 1, in the liquid crystal display device 10 of the present embodiment, a hollowed-out region R10 does not reach any edge of a display surface 24, and the hollowed-out region R10 is provided as a closed region in the display surface 24.

Namely, in Embodiment 1, the hollowed-out region R10 is provided so as to have a stripe shape extending from (i) one vertical shorter side of the horizontally-long rectangular display surface 24 to (ii) the other vertical shorter side of the display surface 24.

On the other hand, in the present embodiment, as shown in (a) of FIG. 7, which is a perspective view schematically illustrating a configuration of the liquid crystal display device 10 of the present embodiment, the hollowed-out region R10 is provided so as to cover a center region of the display surface 24 and to have a shape substantially similar to that of the display surface 24. Therefore, the hollowed-out region R10 does not reach any periphery side of the display surface 24.

Further, almost similarly to the hollowed-out region R10, a light guide body 70 is provided on a center region of the display surface 24 so as to cover the hollowed-out region R10.

Here, in a configuration in which no light guide body 70 is provided on a display surface 24 as shown in (a) of FIG. 6, which is a perspective view schematically illustrating a configuration of a liquid crystal display device 10, bright lines 42 appear along periphery edges of a hollowed-out region R10, as shown in (b) of FIG. 6, which shows a display condition of the display surface 24. Namely, a boundary between a main display region 27 and a sub display region 28 is recognized as a bright line 42.

On the other hand, in the liquid crystal display device 10 of the present embodiment, as described above, the light guide body 70 is provided on a region of the display surface 24 which region corresponds to the hollowed-out region R10. In addition, the light guide body 70, shaped in a rectangle, includes sides each of which is provided with a curved surface section 72.

Consequently, as shown in (b) of FIG. 7, which shows a display condition of the display surface 24 of the liquid crystal display device 10 of the present embodiment, no bright line is observed on the display surface 24, and the main display region 27 and the sub display region 28 are hardly distinguished from each other.

Figure 8:
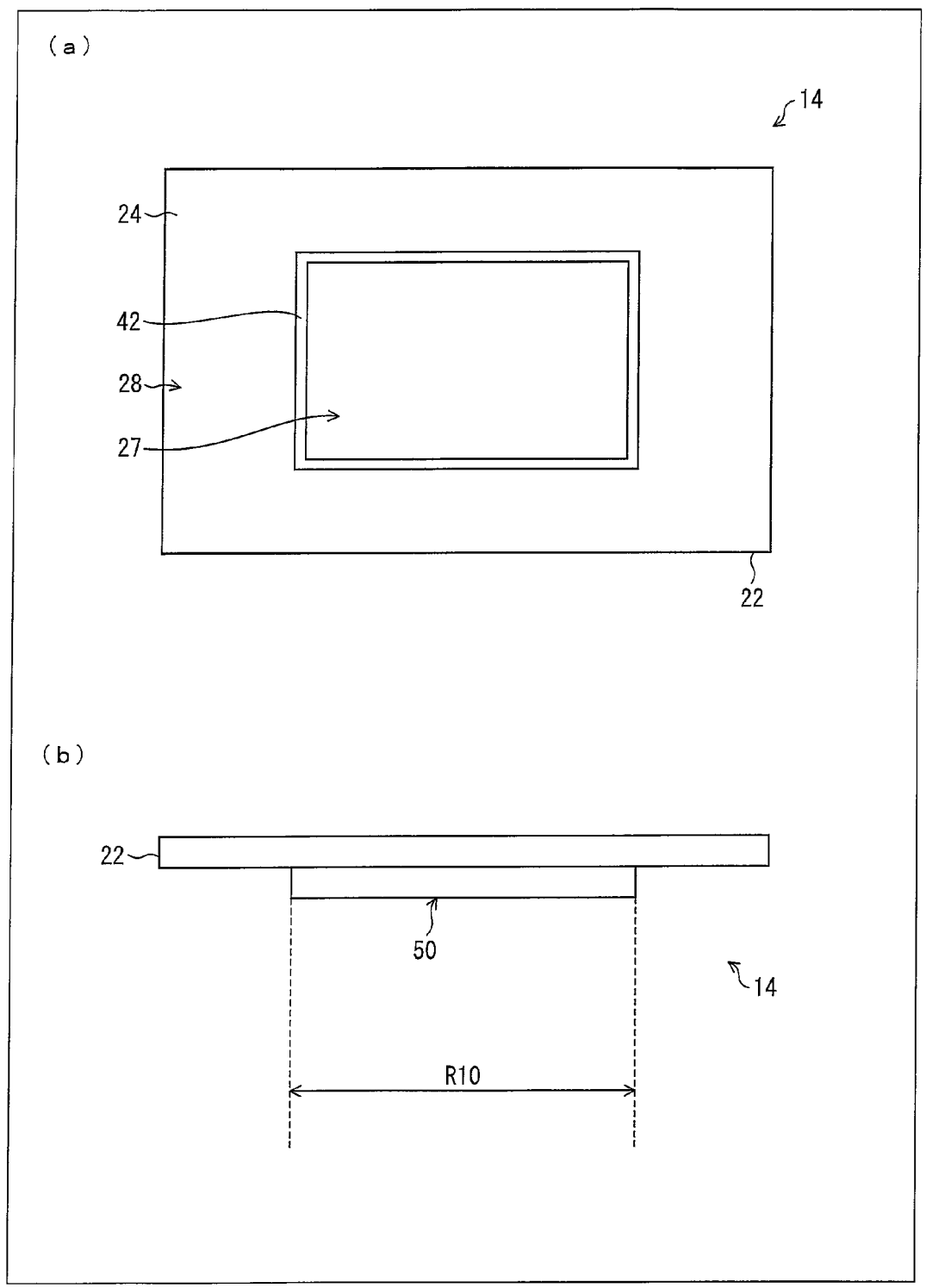
FIG. 8 is a view schematically illustrating a configuration of the liquid crystal display device. (a) of FIG. 8 shows a front view of the liquid crystal display device, and (b) of FIG. 8 shows a bottom view of the liquid crystal display device.

This will be summarized with reference to (a) and (b) of FIG. 8, and (a) and (b) of FIG. 9. Here, (a) of FIG. 8 is a view schematically illustrating a display performed by a conventional display unit 14, and (b) of FIG. 8 is a schematic cross-sectional view of the conventional display unit 14. Meanwhile, (a) of FIG. 9 is a view schematically illustrating a display performed by a display unit 14 of the present embodiment, and (b) of FIG. 9 is a schematic cross-sectional view of the display unit 14 of the present embodiment.

Namely, as shown in (a) and (b) of FIG. 8 and (a) and (b) of FIG. 9, unlike the conventional display unit 14, the display unit 14 of the present embodiment includes the light guide body 70 provided on a region of the liquid crystal display panel 22 which region covers the hollowed-out region R10. Therefore, although a bright line 42 is observed on a region of the display surface 24 of the conventional liquid crystal display panel 22 which region is at and around a boundary between the main display region 27 and the sub display region 28, no such bright line 42 is observed on the display surface 24 of the present embodiment.

This is because that, as described previously, the curved surface sections 72, which are provided for the respective periphery sides of the light guide body 70, make the bright lines 42 inconspicuous.

Note that each of (b) of FIG. 8 and (b) of FIG. 9 shows the configuration in which a shutter section 50 is provided on a back surface of the liquid crystal display panel 22; however, the shutter section 50 is not essential.

Embodiment 3

Figure 10:
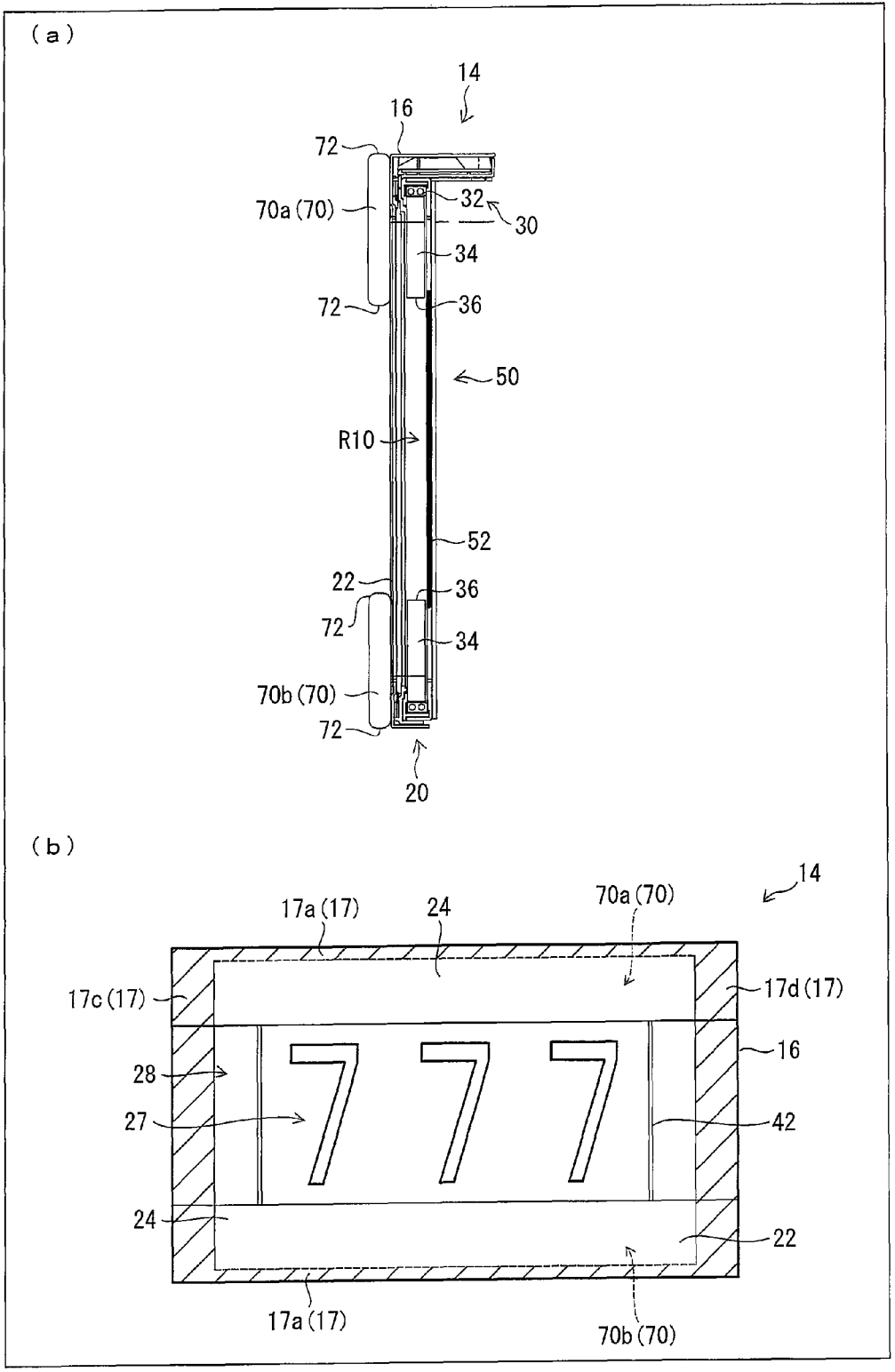
FIG. 10 is a view schematically illustrating a configuration of a liquid crystal display device of further another embodiment of the present invention. (a) of FIG. 10 shows the liquid crystal display device viewed from a side, and (b) of FIG. 10 shows a display condition of a display surface of the liquid crystal display device.

The following will describe further another embodiment of the present invention with reference to (a) and (b) of FIG. 10, etc. Here, (a) of FIG. 10 is a cross-sectional view schematically illustrating a configuration of a display unit 14 in a liquid crystal display device of the present embodiment, viewed from a side, whereas (b) of FIG. 10 is a view illustrating a display condition of a display surface of the display unit 14.

Note that the present embodiment is equal to Embodiment 1, except for features described in the present embodiment. Further, for convenience of explanation, members having the same functions as those explained in drawings of Embodiments 1 and 2 are given the same signs as Embodiments 1 and 2 and explanations thereof are omitted here.

Unlike in the liquid crystal display device 10 of Embodiment 2, in the liquid crystal display device 10 of the present embodiment, a light guide body 70 is provided on a sub display region 28 rather than on a main display region 27.

Namely, in Embodiment 2, the light guide body 70 is provided on the region of the display surface 24 which region covers the hollowed-out region R10, the hollowed-out region R10 being located in a region corresponding to a center of the display surface 24 and having a shape substantially similar to that of the display surface 24. On the other hand, in the present embodiment, the light guide body 70 is provided on a region of the display surface 24 which region covers a light guide plate 34 that has not been hollowed out but remains. More specifically, in the present embodiment, light guide bodies 70 (70a and 70b) are provided so as to cover respective regions of the light guide plate 34, which remains in a frame shape. The light guide bodies 70 are provided on a front side of the display unit 14, which is shaped in a horizontally-long rectangle. One of the regions of the light guide plate 34 is in parallel with an upper, horizontal longer side of the display unit 14, and the other is in parallel with a lower, horizontal longer side of the display unit 14.

More specifically, as shown in (a) of FIG. 10, each of the light guide bodies 70a and 70b is preferably provided so as to have a width extending from (i) a corresponding edge of a display unit chassis 16 to (ii) a position with which the resulting width covers a corresponding edge of the light guide plate 34 (i.e., a corresponding edge surface 36 of the light guide plate).

Further, each light guide body 70, which is shaped in a horizontally-long rectangle, includes curved surface sections 72, each of which is the previously-described edge section having a curvature radius R. The curved surface sections 72 are provided in respective two horizontal longer sides of the periphery sides of the light guide body 70.

Next, with reference to (b) of FIG. 10, the following will describe a display performed by the liquid crystal display device of the present embodiment.

As shown in (b) of FIG. 10, in the liquid crystal display device of the present embodiment, no bright line 42 is observed at and around two parallel horizontal longer ones of the boundary lines of the hollowed-out region R10, which is shaped in a horizontally-long rectangle, and the bright lines 42 are observed only at and around vertical shorter ones of the boundary lines. The reason for this is as follows: Regions at and around the horizontal longer ones of the boundary lines are covered with the curved surface sections 72 of the light guide body 70. On the other hand, for regions at and around the vertical shorter ones of the boundary lines, no curved surface section 72 of the light guide body 70 is provided.

When the liquid crystal display device of the present embodiment is viewed from the front of the display unit 14, how a frame 17 of the display unit chassis 16 is seen is different in (i) a part extending along a vertical direction and (ii) a part extending along a horizontal direction.

Namely, as shown in (b) of FIG. 10, a horizontal longer side part 17a of the frame 17 is seen as if the horizontal longer side part 17a has a smaller width than that of a vertical shorter side part 17b of the frame 17.

The reason for this is as follows: As explained previously, at and around the upper and lower horizontal longer sides of the display unit chassis 16, the curved surface sections 72 of the light guide bodies 70 are provided. Accordingly, in the frame 17, the horizontal longer side part 17a is seen as if the horizontal longer side part 17a has a smaller width than that of the vertical shorter side part 17b.

This increases a pseudo display area of the liquid crystal display device 10, thereby making it possible to perform an earlier-to-see display.

(Game Device)

Next, a game device will be described. The liquid crystal display device 10 of each of the above embodiments is applicable to various devices. For example, the liquid crystal display device 10 of each of the above embodiments is suitably used in game devices, particularly pachinko game devices (pinball game devices).

Figure 11:
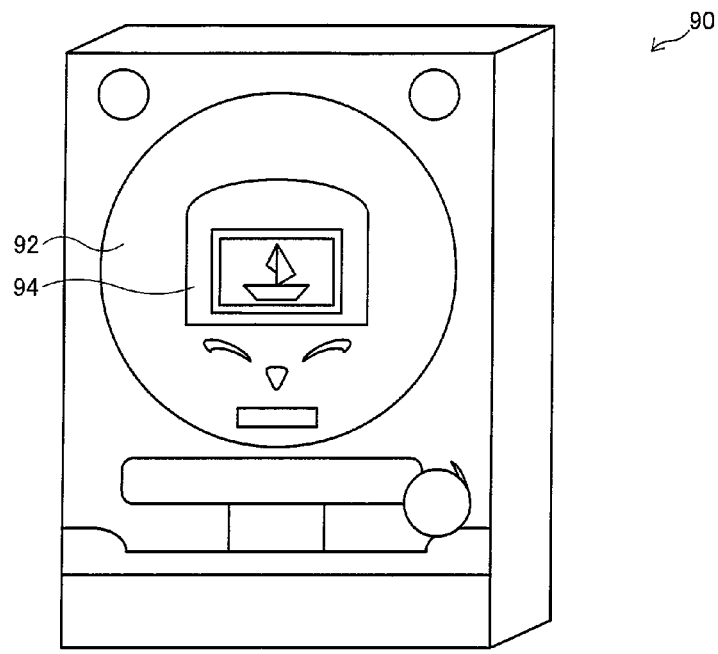
FIG. 11 is a view schematically illustrating a configuration of a game device.
Figure 12:
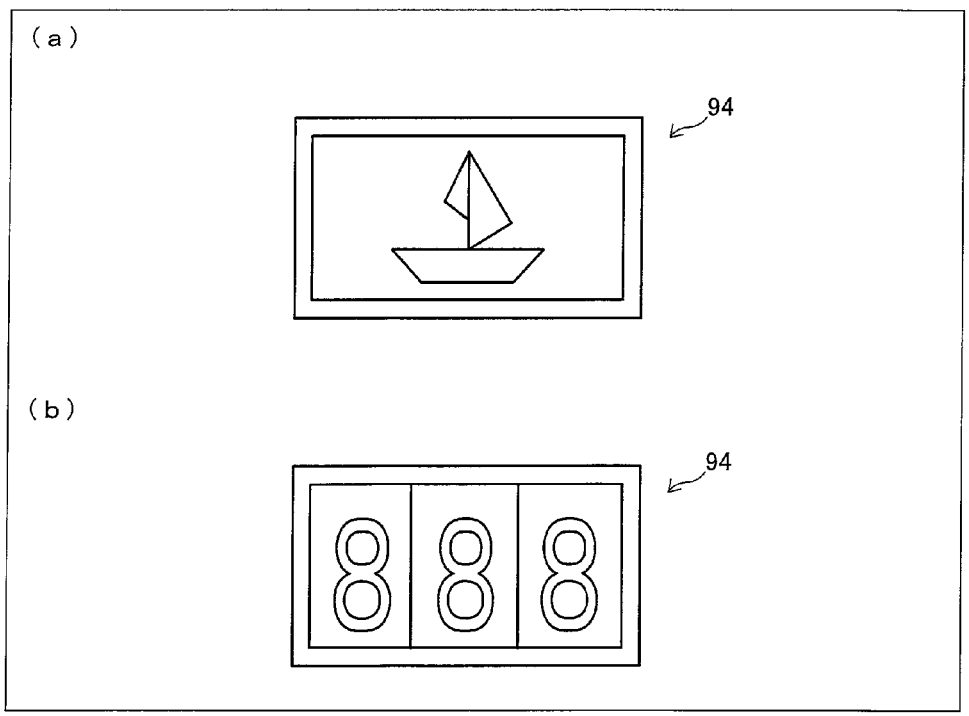
FIG. 12 is a view illustrating displays performed in an information display section of the game device. (a) of FIG. 12 illustrates a display showing an image matching with the theme of the game device, and (b) of FIG. 12 illustrates a display showing numbers on a slot machine.
Figure 13:
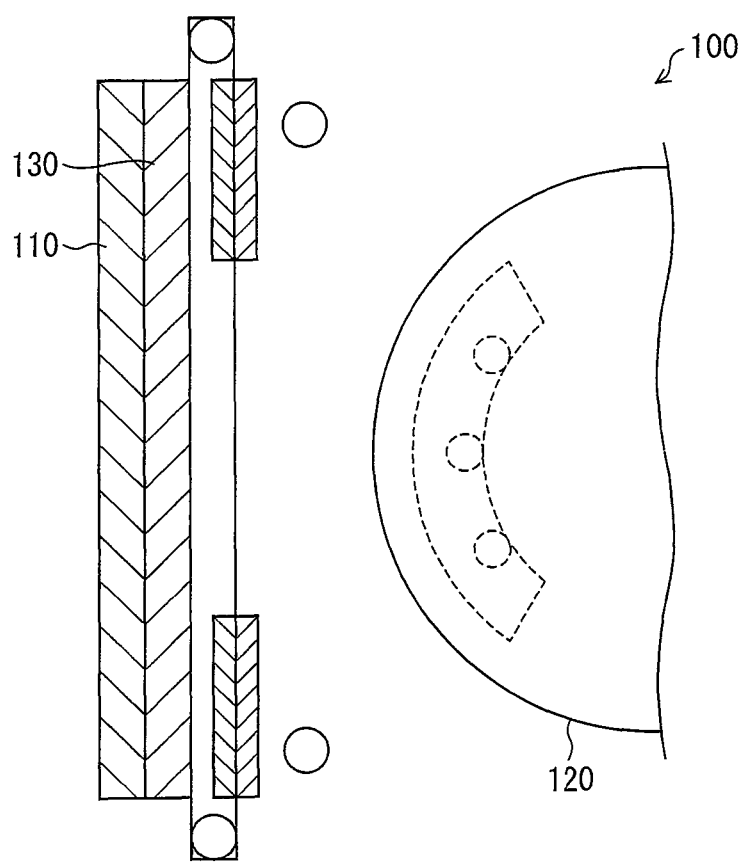
FIG. 13 is a view schematically illustrating a configuration of a display device for a game machine, which display device is described in Patent Literature 1.
Figure 14:
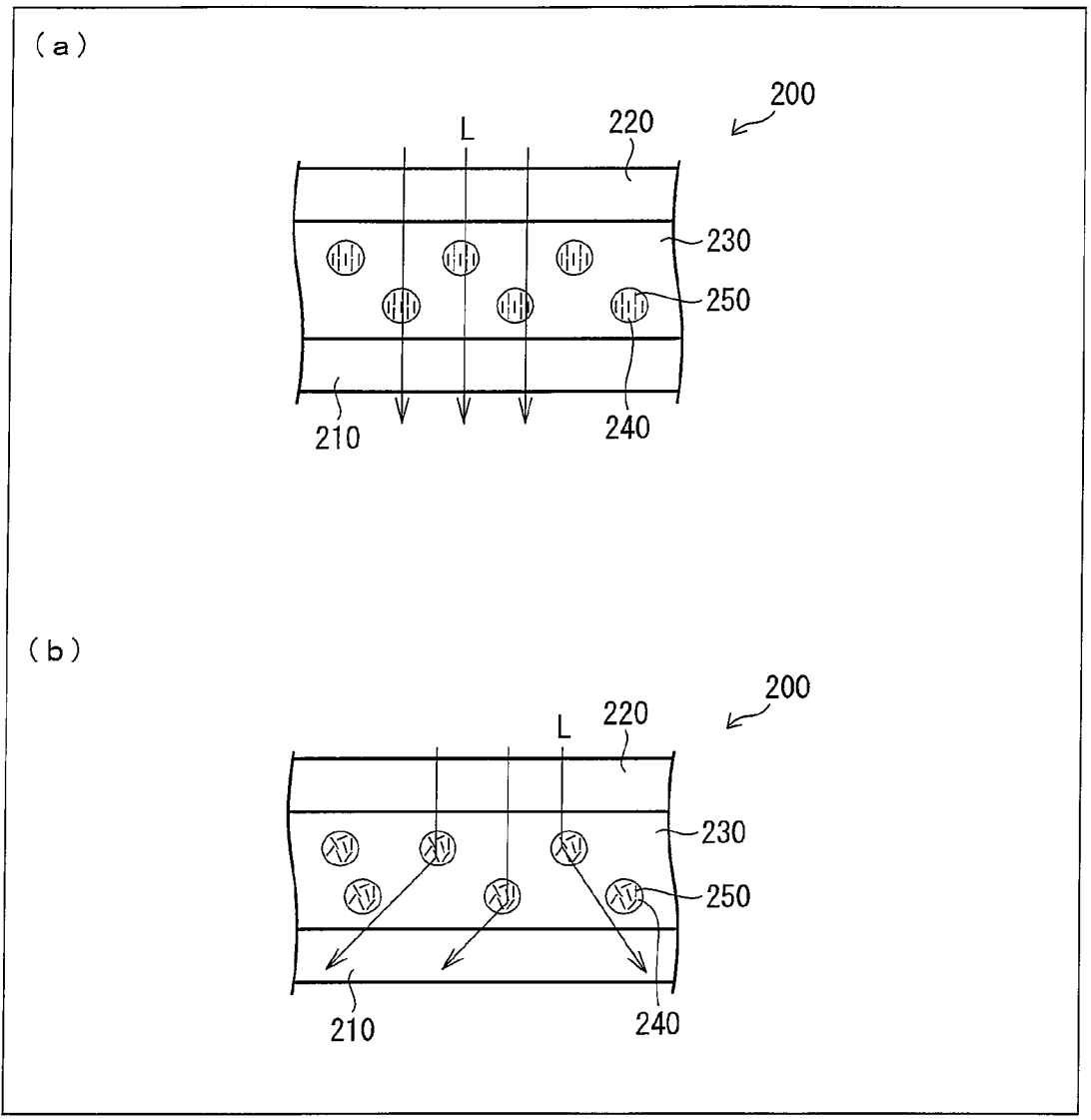
FIG. 14 is a view illustrating states of light observed in a polymer dispersed liquid crystal panel. (a) of FIG. 14 shows a state of light observed while a voltage is applied, and (b) of FIG. 14 shows a state of light observed while no voltage is applied.

This will be described with reference to FIG. 11. An example of the game device 90, shown in FIG. 11, can be a pachinko game device. The pachinko game device includes, as the information display section 94 in the game board 92, the liquid crystal display device 10 of each of the above embodiments.

In such the configuration, a player of the game device 90 is the observer of the liquid crystal display device 10. The player can see, in the information display section 94, (i) content displayed on the liquid crystal display panel 22 and (ii) the accessory object 60 provided behind the liquid crystal display panel 22.

The present invention is not limited to the description of the embodiments above, but may be altered by a skilled person within the scope of the claims. An embodiment based on a proper combination of technical means disclosed in different embodiments is encompassed in the technical scope of the present invention.

(Shutter Liquid Crystal Panel)

The foregoing has explained the shutter liquid crystal panel for the accessory object 60 by taking the polymer dispersed liquid crystal panel as an example. However, the shutter liquid crystal panel of the present invention is not limited to this example.

Namely, the shutter liquid crystal panel may be any one, as long as it can switch between transmission and non-transmission of light according to the selected display mode (display or non-display) for the accessory object. For example, the shutter liquid crystal panel may be a generally-used TN (Twisted Nematic) type liquid crystal display panel including a polarizing plate. In the case where the TN type liquid crystal display panel is used as the shutter liquid crystal panel, the accessory object 60 can be shielded more favorably, while the display mode for the accessory object is set to "non-display".

Meanwhile, as described previously, in a light scattering state, the polymer dispersed liquid crystal display can cause scatter reflection of light or cause the liquid crystal display panel itself to become brighter. Therefore, the polymer dispersed liquid crystal display can provide a brighter display thereon.

Alternatively, the shutter section may be constituted by other member, without use of a liquid crystal panel. Examples of such the member encompass a roll type shutter mechanism and a slide-open/close type shutter mechanism.

Further, the foregoing has explained the configuration including the shutter section 50 so as to switch between a visible state and an invisible state (non-shielded state and shielded state) for the accessory object 60. However, the liquid crystal display device 10 of the present invention is not limited to this configuration, and may not include the shutter section 50.

In such the configuration, the accessory object section 18 can be configured so as to be movable (e.g., rotatable) for switching between the visible state and the invisible state. Specifically, for example, the accessory object section 18 can be configured so as to be rotatable (e.g., as a slot roll), and a display object which is desired to be shown to the observer can be provided on a surface and/or the inside of the accessory object section 18.

Further, explained herein as providing, in the light-emitting surface of the backlight unit 30, regions for emitting lights of respective different brightness levels is hollowing out a region of the light guide plate 34 of the backlight unit 30. However, how to provide the regions for emitting lights of respective different brightness levels is not limited to providing the hollowed-out region. Instead, for example, the following configuration, in each of which no hollowed-out region is provided in a light guide plate, are possible: a configuration in which reflection patterns of different distributions are printed on a light guide plate; a configuration in which only a region of a backlight chassis is hollowed out; and a configuration in which a surface of a backlight chassis is caused to have different reflectance levels.

INDUSTRIAL APPLICABILITY

A liquid crystal display device of the present invention is capable of switching between (i) a display of an image and (ii) a display of an accessory object. Therefore, the liquid crystal display device of the present invention is suitably applicable to amusement equipment such as game devices.

REFERENCE SIGNS LIST

90 Game Device
10 Liquid crystal display device
22 Liquid crystal display panel
24 Display surface
26 Boundary line
30 Backlight unit
34 Light guide plate 52 Shutter liquid crystal panel
60 Accessory object
70 Light guide body (optical member)
R10 Hollowed-out region

The invention claimed is:

1. A liquid crystal display device, comprising:
a liquid crystal display panel arranged to display an image; and
a backlight unit provided behind the liquid crystal display panel, wherein
the backlight unit includes a light-emitting surface including at least two regions which respectively emit lights of different brightness levels,
the liquid crystal display panel including a display surface including regions which respectively correspond to the at least two regions and which are arranged to perform respective different displays,
the display surface of the liquid crystal display panel is provided with an optical member which is transparent, includes a flat or substantially flat upper surface at a central portion thereof, and also includes an outer boundary portion which, when seen in plan view, overlaps at least a boundary line between said at least two regions of the light-emitting surface of the backlight unit, and
the outer boundary portion of the optical member includes a cross section in a thickness direction of the optical member which has a curvature.

2. The liquid crystal display device as set forth in claim 1, wherein:
the backlight unit includes a light guide plate;
a region of the light guide plate is hollowed out, so as to provide said at least two regions; and
the boundary line corresponds to an edge surface of the light guide plate, the edge surface being defined by hollowing out the region of the light guide plate.

3. The liquid crystal display device as set forth in claim 2, wherein:
the optical member is provided so as to cover the hollowed-out region of the light guide plate, when seen in a plan view.

4. The liquid crystal display device as set forth in claim 2, further comprising:
an accessory object provided behind the backlight unit; and
a shutter liquid crystal panel arranged to shield the accessory object, the shutter liquid crystal panel being provided in a region between the backlight unit and the accessory object so as to overlap the hollowed-out region of the light guide plate.

5. The liquid crystal display device as set forth in claim 4, wherein:
the shutter liquid crystal panel is a polymer dispersed liquid crystal panel.

6. The liquid crystal display device as set forth in claim 1, wherein:
the optical member, which is transparent, has a light transmittance of 80% or more.

7. The liquid crystal display device as set forth in claim 1, wherein:
a radius of the curvature is 10 mm or more and not more than 100 mm.

8. A game device comprising a liquid crystal display device as set forth in claim 1.

* * * * *